(12) United States Patent
Ikeda

(10) Patent No.: US 6,212,294 B1
(45) Date of Patent: *Apr. 3, 2001

(54) IMAGE PROCESSING METHOD AND APPARATUS THEREFOR

(75) Inventor: Hiroaki Ikeda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/807,032

(22) Filed: Feb. 28, 1997

Related U.S. Application Data

(63) Continuation of application No. 08/245,158, filed on May 17, 1994, now abandoned.

(30) Foreign Application Priority Data

Jun. 2, 1993 (JP) .................................................. 5-156244

(51) Int. Cl.⁷ ...................................................... G06K 9/34
(52) U.S. Cl. .......................... 382/173; 382/174; 382/175; 382/177
(58) Field of Search .................................... 382/174, 175, 382/177, 173; 395/148, 136; 348/453

(56) References Cited

U.S. PATENT DOCUMENTS

| | | | |
|---|---|---|---|
| 4,547,811 | * | 10/1985 | Ochi et al. ................................ 382/9 |
| 4,594,732 | * | 6/1986 | Tsuji ..................................... 382/174 |
| 4,641,351 | * | 2/1987 | Fukunaga et al. ..................... 382/13 |
| 4,725,960 | * | 2/1988 | Shima et al. ..................... 364/474.26 |
| 4,760,463 | * | 7/1988 | Nonoyama et al. .................. 358/453 |
| 4,893,346 | * | 1/1990 | Bishop ..................................... 382/8 |
| 4,903,312 | * | 2/1990 | Sato ........................................ 382/9 |
| 4,932,065 | * | 6/1990 | Feldgajer ................................ 382/9 |
| 4,951,231 | * | 8/1990 | Dickinson et al. .................. 395/136 |
| 5,075,895 | * | 12/1991 | Bessho ................................. 389/175 |
| 5,093,873 | * | 3/1992 | Takahasi .............................. 382/177 |
| 5,123,062 | * | 6/1992 | Sangu ................................... 382/174 |
| 5,438,657 | * | 8/1995 | Nakatani ............................... 395/148 |

FOREIGN PATENT DOCUMENTS

| | | | |
|---|---|---|---|
| 0566293 | 10/1993 | (EP) | ............................. G06F/15/72 |
| 0439951 | 8/1997 | (EP) | ............................. G06F/15/72 |

OTHER PUBLICATIONS

Catchword Pro–User's Guide Macintosh Version, Logitech Inc., pp 17–26.

Anonymous "Object–Picking Method by Hierarchical Hand–Marking," IBM Technical Disclosure Bulletin, vol. 30, No. 9, Feb. 1988, pp. 348–350.

\* cited by examiner

Primary Examiner—Jose L. Couso
Assistant Examiner—Anh Hong Do
(74) Attorney, Agent, or Firm—Fitzpatrick, Cella, Harper & Scinto

(57) ABSTRACT

An image processor which receives an image and assigns position of an arbitrary pixel in the image. An image block is extracted from the received image, and start and end positions of a designated area of the received image are acquired. A designated image block in the extracted image block is designated for processing in accordance with the start and end positions of the designated area of the received image.

42 Claims, 21 Drawing Sheets

IMAGE PROCESSING METHOD AND APPARATUS THEREFOR

This application is a continuation of application Ser. No. 08/245,158 filed May 17, 1994, now abandoned.

BACKGROUND OF THE INVENTION

1. Field of the Invention

The present invention relates to an image processing method and an image processing apparatus for appointing an area in a supplied image.

2. Description of the Prior Art

Hitherto, wide use of image reading apparatus, such as image scanners, result in known image processing apparatus (image processing software included) which are capable of using or processing an image read photoelectrically.

In order to appoint a partial area of an image formed by a conventional image processing apparatus of the foregoing type, there has been a most usual method that appoints, i.e. designates or assigns, an area within a rectangular shape. The method comprises the steps of displaying an image on a display, and acquiring coordinates of the diagonals of an area in the image to be appointed by using a pointing device, such as a mouse.

There is another method for appointing an area within a polygon. The foregoing method comprises the step of sequentially appointing vertexes of an appointed polygon. Thus, an area in the form of a further complicated shape can be appointed.

For example, the following portions can be appointed from an original image formed on a display device as shown in FIG. 21: a character image 2101 which is a portion of a document, a table image 2102, an image 2103 of a graph and its title and a portion 2104 of a half tone image, such as a photograph.

However, appointing of the character image 2101 with the foregoing conventional image processing apparatus using a polygon to appoint an area because the area cannot be appointed within a rectangle has a problem that a large number of operations must be performed to appoint the area because the polygon has 8 vertexes, thus resulting in requiring an excessively long time to complete the appointing process.

When an image is displayed on the display device, the original image is thinned to make the overall area of the image to be included in the display. If an area is appointed on the displayed screen, an accurate position cannot easily be appointed. Therefore, an image adjacent to the boundary, which must be positioned on the outside of the appointed area, is undesirably introduced into the appointed area, and therefore a problem arises that an area cannot accurately be appointed.

In order to overcome the foregoing problems, there is a technology having an arrangement that an original image or an image having a changed thinning magnification is displayed to appoint an accurate position. However, the foregoing case results in a necessity of additional operations exemplified by an operation of switching the displaying magnification of a displayed image and an image scrolling operation and the like. As a result, the number of operations required to complete the area appointment increases and thus a problem arises in that the operation of appointing an area becomes too complicated.

That is, although the appointment of an image can be considered as a selection of pixels, there are many cases that the minimum unit of an appointed area does not need to be the pixel unit. For example, one character image unit is the minimum unit of the character image 2101, the line and the array or cell unit is the same as the table image 2102, the graph portion and the title portion are the same as the image 2103 of the graph and its title. In the foregoing circumstance, the conventional image processing apparatus enables only the appointment in a pixel unit to be performed, and accordingly the foregoing problems arise.

SUMMARY OF THE INVENTION

The present invention is directed to overcoming the problems experienced with the foregoing conventional technology, and therefore an object of the present invention is to provide an image processing method and an apparatus which are capable of easily appointing a portion of a supplied image with a decreased number of operations or by easily making a subject image visible.

In order to achieve the foregoing object, according to a first aspect of the present invention, there is provided an image processing method capable of receiving an image and appointing a position of an arbitrary pixel in the image, the image processing method comprising: an image block taking process for taking an image block from the received image; a start position acquiring process for acquiring a start position of an appointed area; an end position acquiring process for acquiring an end position of the appointed area; and an appointed image block determining process for determining an appointed image block in the taken image block in accordance with the start position of the appointed area and the end position of the appointed area.

As a result, the area appointment of a portion of an image can be performed in image block units, and therefore the area appointment operation can easily be performed.

In order to achieve the foregoing object, according to a second aspect of the present invention, there is provided an image processing method having a plurality of image area appointing processes, the image processing method comprising: a switching process of switching the image area appointing process.

As a result, the area appointment operation can easily be performed.

In order to achieve the foregoing object, according to a third aspect of the present invention, there is provided an image processing apparatus capable of receiving an image and appointing a position of an arbitrary pixel in the image, the image processing apparatus comprising: image block taking means for taking an image block from the received image; start position acquiring means for acquiring a start position of an appointed area; end position acquiring means for acquiring an end position of the appointed area; and appointed image block determining means for determining an appointed image block in the taken image block in accordance with the start position of the appointed area and the end position of the appointed area.

As a result, the area appointment of a portion of an image can be performed in image block units, and therefore the area appointment operation can easily be performed.

In order to achieve the foregoing object, according to a fourth aspect of the present invention, there is provided an image processing apparatus having a plurality of image area appointing means, the image processing apparatus comprising: switch means for switching the image area appointing means.

As a result, the area appointment operation can easily be performed.

In order to achieve the foregoing object, according to another aspect of the present invention, it is preferable that an image processing method according to the first aspect further comprises: a connection process for connecting the image block taken in the image block taking process to one image block array; a start image block determining process for determining an appointment area start image block in accordance with the start position of the appointed area; an end image block determining process for determining an appointed area end image block in accordance with the end position of the appointed area; and an appointed image block determining process for determining image blocks in the image block array existing from the appointed area start image block to the appointed area end image block as the appointed image blocks.

In order to achieve the foregoing object, according to another aspect of the present invention, it is preferable that an image processing method according to the first aspect further comprises: a connection process for connecting an image block taken in the image block taking process to one unit of an image block matrix; a start image block determining process for determining the start image block in the appointed area in accordance with the start position of the appointed area; an end image block determining process for determining the end image block in the appointed area in accordance with the end position of the appointed area; and an appointed image block determining process for determining, as the appointed image blocks, image blocks in the image block matrix existing from a line on which the appointed area start image block exists to a line on which the appointed area end image block exists and from a column on which the appointed area start image block exists to a column on which the appointed area end image block exists.

In order to achieve the foregoing object, according to another aspect of the present invention, it is preferable that an image processing method according to the first aspect further comprises: an image block display process for displaying an image block taken prior to performing an area appointment of the image when the image block is taken prior to performing the area appointment of the image.

In order to achieve the foregoing object, according to another aspect of the present invention, it is preferable that an image processing method according to the first aspect further comprises: a start position and end position display process for displaying the start position and the end position of the appointed area respectively acquired in the start position acquiring process and the end position acquiring process.

In order to achieve the foregoing object, according to another aspect of the present invention, it is preferable that an image processing method according to the first aspect further comprises: an appointed area image block display process for displaying the image block set to the appointed area in a manner different from a method of displaying residual image blocks.

In order to achieve the foregoing object, according to another aspect of the present invention, it is preferable that an image processing method according to the first aspect further comprises: an appointment dismissing process for dismissing appointment of the image block set to the appointed area.

In order to achieve the foregoing object, according to another aspect of the present invention, it is preferable that an image processing method according to the first aspect further comprises: an appointed image block adding process for adding, as the appointed image block, an image block, the area of which has not been appointed.

In order to achieve the foregoing object, according to another aspect of the present invention, it is preferable that an image processing method according to the first aspect further comprises: a discrimination process for discriminating whether or not the start position of the appointed area and the end position of the appointed area exist in the same region on a divided image which can be divided into one to several regions; and an appointed image block determining process for determining appointed image blocks in the image blocks in the same region.

In order to achieve the foregoing object, according to another aspect of the present invention, it is preferable that an image processing apparatus according to the third aspect further comprises: connection means for connecting the image block taken by the image block taking means to one image block array; start image block determining means for determining an appointment area start image block in accordance with the start position of the appointed area; end image block determining means for determining an appointed area end image block in accordance with the end position of the appointed area; and appointed image block determining means for determining image blocks in the image block array existing from the appointed area start image block to the appointed area end image block as the appointed image blocks.

In order to achieve the foregoing object, according to another aspect of the present invention, it is preferable that an image processing apparatus according to the third aspect further comprises: connection means for connecting an image block taken by the image block taking means to one unit of image block matrix; start image block determining means for determining the start image block in the appointed area in accordance with the start position of the appointed area; end image block determining means for determining the end image block in the appointed area in accordance with the end position of the appointed area; and appointed image block determining means for determining, as the appointed image blocks, image blocks in the image block matrix existing from a line on which the appointed area start image block exists to a line on which the appointed area end image block exists and from a column on which the appointed area start image block exists to a column on which the appointed area end image block exists.

In order to achieve the foregoing object, according to another aspect of the present invention, it is preferable that an image processing apparatus according to the third aspect further comprises: image block display means for displaying an image block taken prior to performing an area appointment of the image when the image block is taken prior to performing the area appointment of the image.

In order to achieve the foregoing object, according to another aspect of the present invention, it is preferable that an image processing apparatus according to the third aspect further comprises: start position and end position display means for displaying the start position and the end position of the appointed area respectively acquired by the start position acquiring means and the end position acquiring means.

In order to achieve the foregoing object, according to another aspect of the present invention, it is preferable that an image processing apparatus according to the third aspect further comprises: appointed area image block display means for displaying the image block set to the appointed area in a manner different from a method of displaying residual image blocks.

In order to achieve the foregoing object, according to another aspect of the present invention, it is preferable that an image processing apparatus according to the third aspect further comprises: appointment dismissing means for dismissing appointment of the image block set to the appointed area.

In order to achieve the foregoing object, according to another aspect of the present invention, it is preferable that an image processing apparatus according to the third aspect further comprises: appointed image block adding means for adding, as the appointed image block, an image block, the area of which has not been appointed.

In order to achieve the foregoing object, according to another aspect of the present invention, it is preferable that an image processing apparatus according to the third aspect further comprises: discrimination means for discriminating whether or not the start position of the appointed area and the end position of the appointed area exist in the same region on a divided image which can be divided into one to several regions; and appointed image block determining means for determining appointed image blocks in the image blocks in the same region.

According to the image processing method and an apparatus therefor according to the present invention, when an area of a portion of an image is appointed, the area appointment is performed in image block units. Therefore, the area appointment operation can easily be performed, the operation of appointing the area can efficiently be performed, the area appointment can accurately be completed, and therefore an effect can be obtained in that an efficient appointed area can be obtained. When an image, an area of which has been appointed, is subjected to another process, the spaces between lines and between characters are not included in the appointed areas in, for example, an optical character reader (an OCR). Therefore, effects can be obtained in that the time taken to complete transfer can be shortened when an image is transferred and that the capacity required to store an image can be saved when the image is stored in a memory or the like.

Other and further objects, features and advantages of the invention will be appear more fully from the following description.

DESCRIPTION OF THE PREFERRED EMBODIMENTS

Preferred embodiments of the present invention will now be described with reference to the drawings.

First Embodiment

Figure 1:
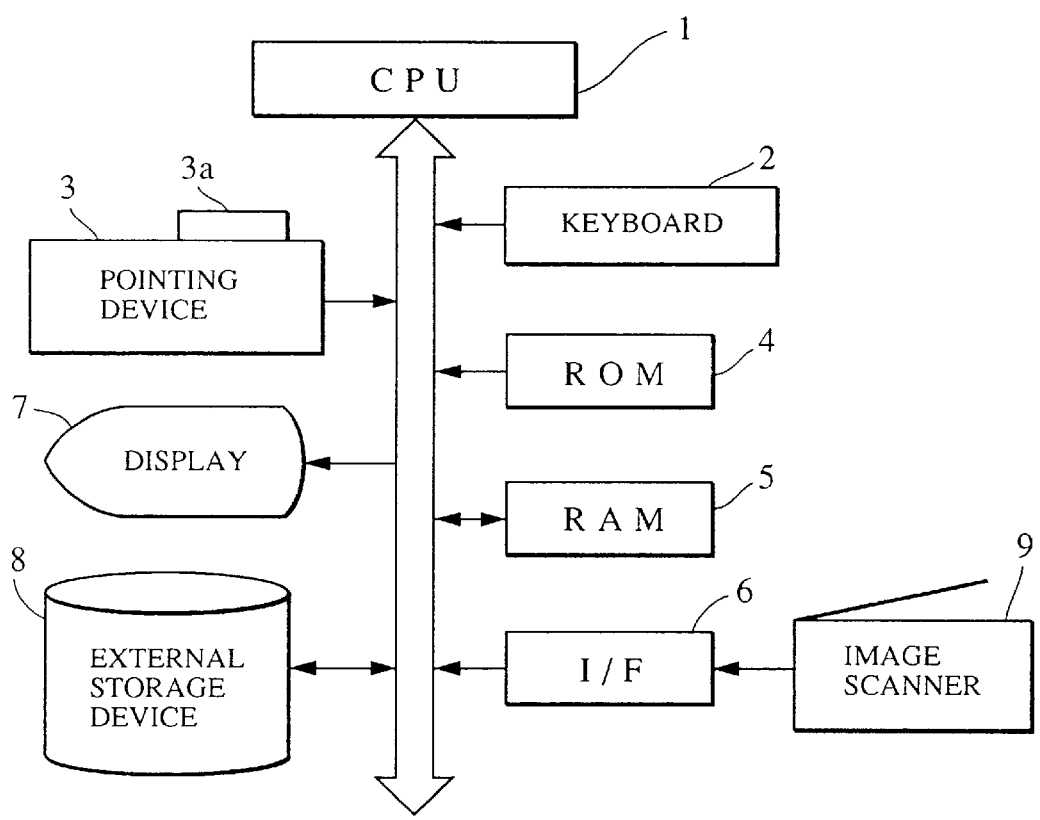
FIG. 1 is a block diagram which illustrates a structure of an image processing apparatus according to a first embodiment of the present invention.

A first embodiment of the present invention will now be described with reference to FIGS. 1 to 4. FIG. 1 is a block diagram which illustrates the structure of an image processing apparatus according to the first embodiment of the present invention. A CPU (Central Processing Unit) 1 controls all operations of the image processing apparatus to be performed in accordance with a control program stored in a ROM (Read Only Memory) 4 to be described later. The following units are connected to CPU 1 through control lines: a keyboard (a character image input means) 2, a pointing device 3, the ROM 4, a RAM (Random Access Memory) 5, an I/F (interface) 6, a display 7, such as a CRT or a liquid crystal display, and an external storage unit 8.

The keyboard 2 has a plurality of keys and is used to input/modify a character image. The pointing device 3 comprises a mouse or the like having a depression button 3a which is operated when an image, or an area in the image displayed on the display 7 is appointed. The ROM 4 stores a program or the like for controlling the processes to be performed by the image processing apparatus, for example, processes shown in a flow chart to be described later, and to be performed by CPU 1. An image scanner 9 for reading images is connected to the I/F 6. The display 7 displays a supplied image or the like. The external storage unit 8 comprises a magnetic disk or the like to record various data items.

Figure 2:
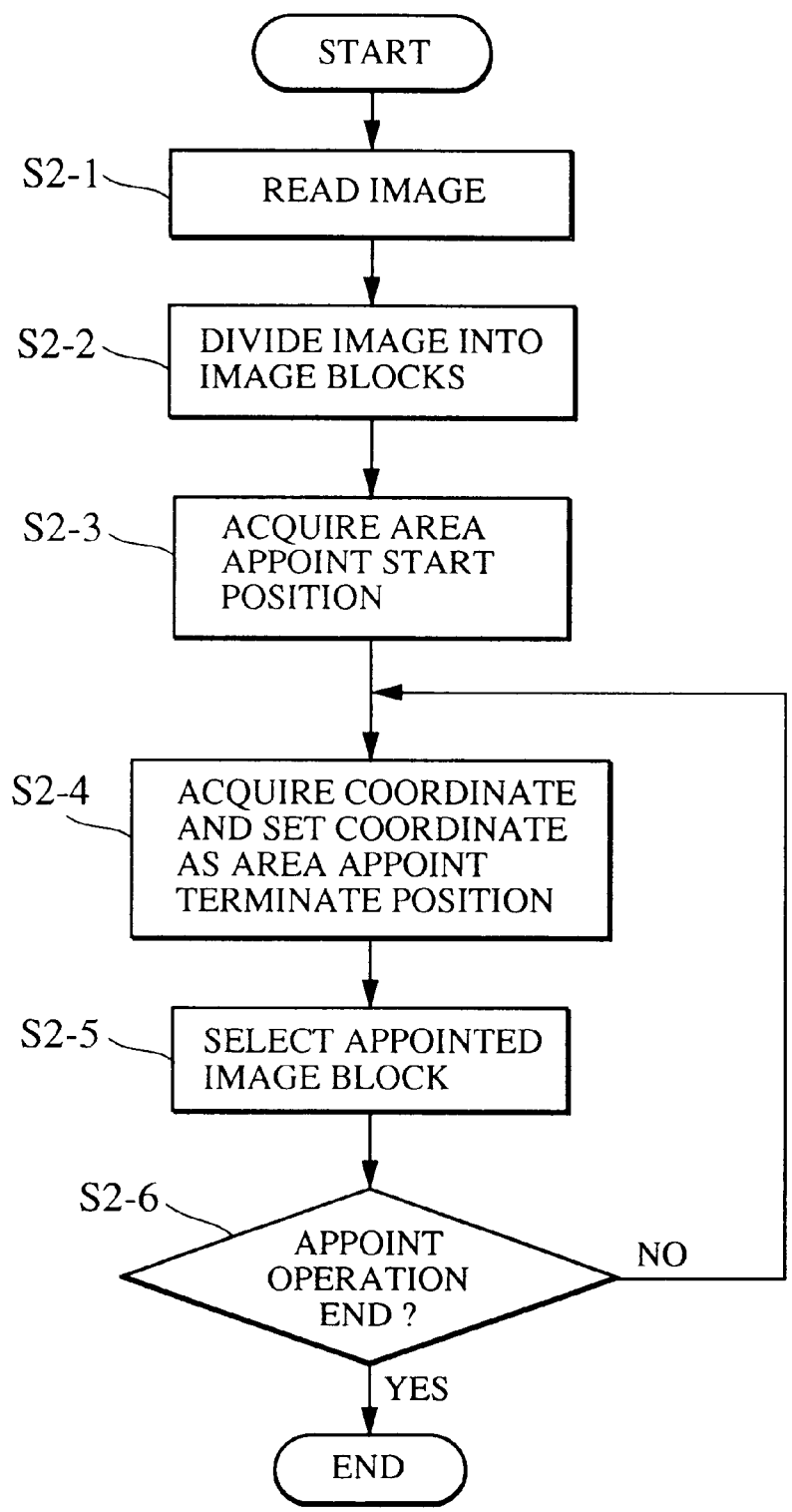
FIG. 2 is a flow chart which illustrates a procedure of controlling an area appointing process to be performed by the apparatus of FIG. 1.
Figure 7A:
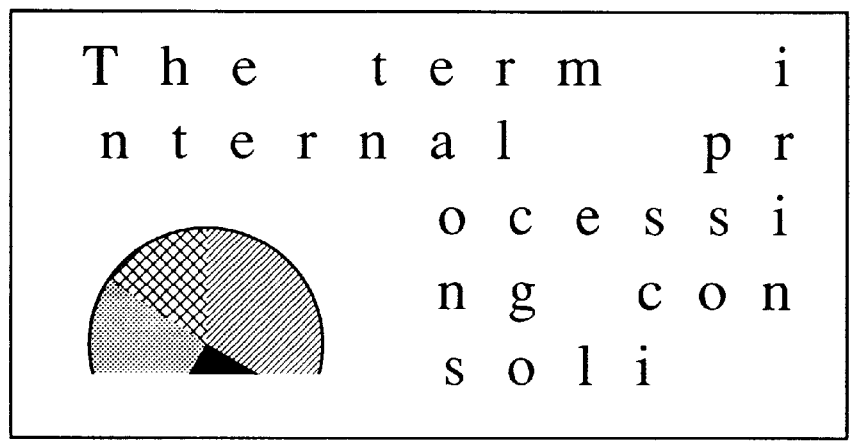
FIGS. 7A–7C are diagrams which illustrate a state of a display of the apparatus of FIG. 1.
Figure 7B:
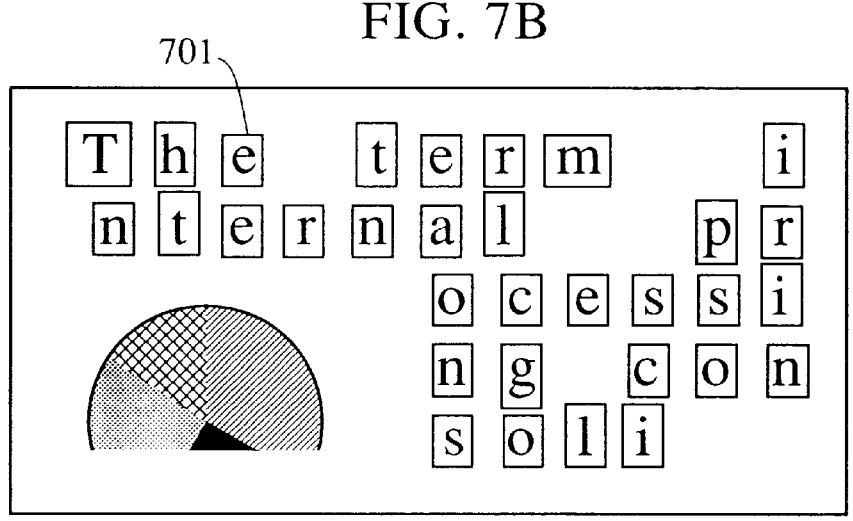
Figure 7C:
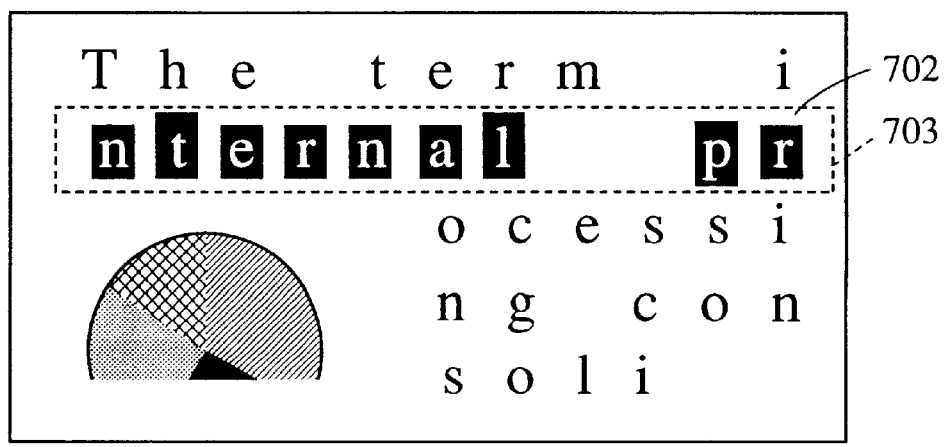

An image area appointing operation to be performed by the image processing apparatus having the foregoing structure will now be described with reference to FIGS. 2 and 7A–7C. FIG. 2 is a flow chart which illustrates a procedure of controlling the image area appointing operation. FIGS. 7A–7C illustrate states of the display 7 on which the process for appointing an area of the image is being performed.

First, in step S2-1 shown in FIG. 2, image information is read by the image scanner 9 or images previously stored in the external storage unit 8 are read. A state of the display 7 at this time is shown in FIG. 7A. In step S2-2 CPU 1 divides the supplied image into image blocks. A state of the display 7 at this time is shown in FIG. 7B. Referring to FIG. 7B, reference numeral 701 represents one image block. Although the divided image blocks are displayed on the display 7 in this embodiment, the display may be omitted. The display of the image block in step S2-1 may be omitted but the image block may be displayed on the display 7 when the process in step S2-2 is completed.

In step S2-3 a point on the image at which the depression button 3a of the pointing device 3 is depressed is set to a start point of the area appointment. The CPU 1 acquires the coordinates of the start point. Then, in a state where the depression button 3a of the pointing device 3 is being depressed, the pointing device 3 is moved to an end point of the appointment. When the depression of the depression button 3a is released, the operation of appointing the area is completed. In step S2-4, CPU 1 acquires the position of the pointing device 3. In step S2-5, CPU 1 selects an appointed image block from image blocks, the appointed image block including the appointment end position which is the position of the pointing device 3 acquired in step S2-4. A state of the display 7, on which the area is being appointed, is shown in FIG. 7C. Referring to FIG. 7C, reference numeral 702 represents a rectangular appoint range having, at its diagonal positions, the area appointment start position and the area appointment completion position. Reference numeral 703 represents one appointed image block which is inversely displayed.

After CPU 1 selects, in step S2-5, an appointed image block from image blocks, the appointed image block including the appointment end position which is the position of the pointing device 3 acquired in step S2-4, CPU 1, in step S2-6, discriminates whether or not the appointment operation has been completed. If the depression of the depression button 3a of the pointing device 3 has been released, CPU 1 discriminates that the appointment operation has been completed. Thus, the finally acquired position is set to the final appointed end position and the processing operation in this embodiment is completed. If the depression of the depression button 3a has not been released, a discrimination is made that the appointment operation has not been completed, and the flow returns to step S2-4.

Figure 3:
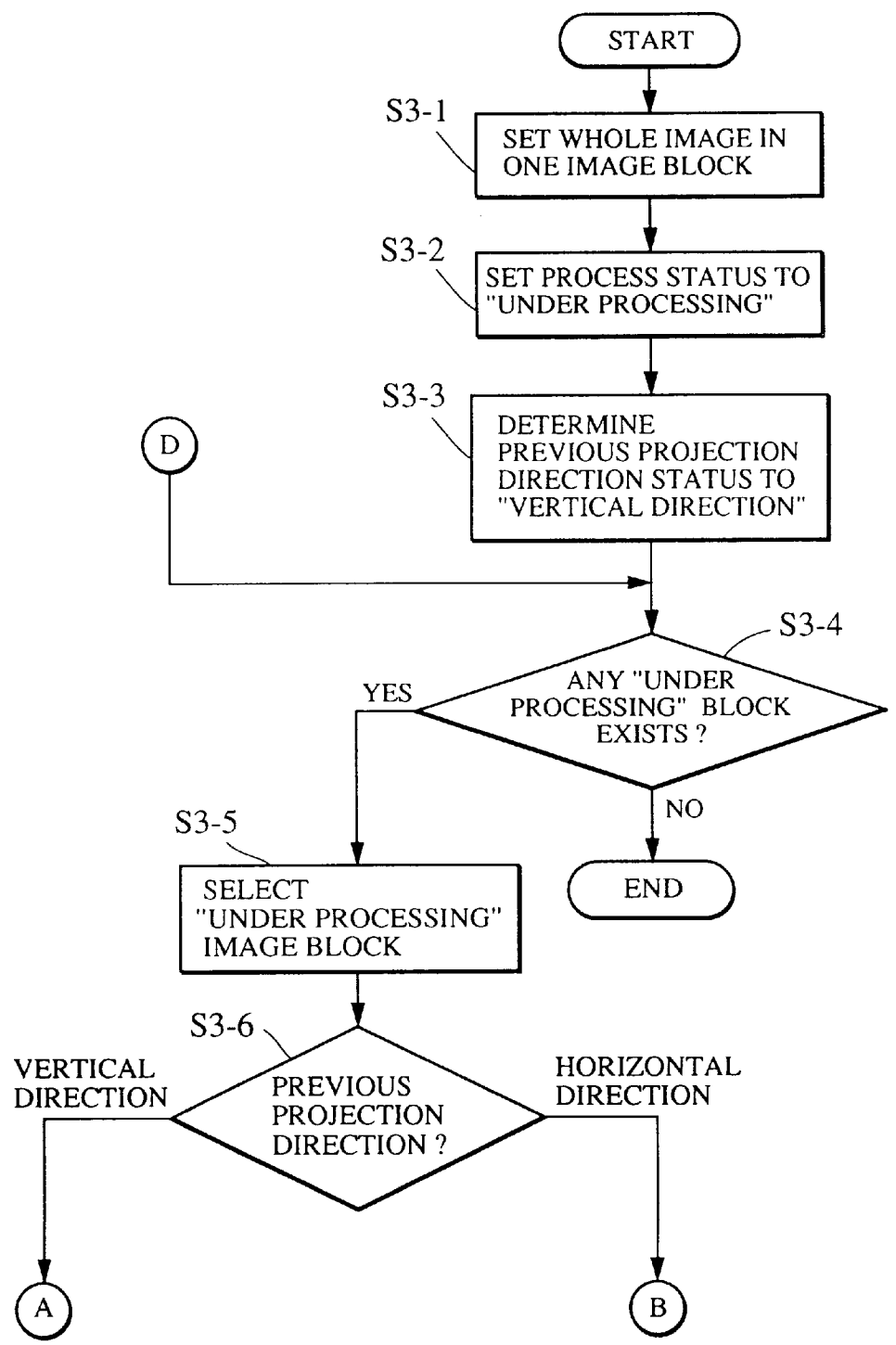
FIG. 3 is a flow chart which illustrates a procedure of controlling an image block dividing process to be performed by the apparatus of FIG. 1.

An example of the process to be executed in step S2-2 shown in FIG. 2, that is, a process of dividing an image into image block will now be described with reference to a flow chart shown in FIGS. 3 to 5. First, an image to be processed in step S3-1 shown in FIG. 3 is treated as one image block. The image block has, as information, "process status", "pervious projection direction status" and the position of the image block, with each state being allowed to have states "under processing", "end of the process", "vertical direction" and "horizontal direction".

In step S3-2 CPU 1 initializes the "process status" of the set image block to "under processing", and initializes the "previous projection direction status" to the "horizontal direction" in step S3-3. It should be noted that the "previous projection direction status" may be initialized to the "horizontal direction". The necessity lies in the initialization.

In step S3-4 CPU 1 searches an image block, the "process status" of which is the "under processing" (discriminates whether or not any image block which is "under processing" exists). If no image block of the foregoing type exists, this processing operation is ended. If the image block is present, the flow proceeds to step S3-5. In step S3-5 CPU 1 selects one image block, the "process status" of which is the "under processing". In step S3-6 CPU 1 discriminates whether or not the "previous projection direction status" is the "vertical direction" or the "horizontal direction". If it is in the "vertical direction", the flow proceeds to step S3-7 shown in FIG. 4. If it is in the "horizontal direction", the flow proceeds to step S3-16 shown in FIG. 5.

The routine of FIG. 4 will now be described. In step S3-7 CPU 1 sets the projection direction to horizontal. In step S3-8 CPU 1 discriminates whether or not plural projections exist. If plural projections exist, CPU 1, in step S3-9, divides the image blocks in a horizontal direction into the number of the projections. At this time, the position information of each image block is set in such a way that the upper and lower positions of the projection are used as the upper and lower coordinates and that the right and left positions of the image block, which has not been divided, are used as the right and left coordinates. Then, CPU 1, in step S3-10, sets all "process status" to "under processing", and, in step S3-11, CPU 1 sets all "previous projection direction status" of the image blocks, which have been divided in step S3-11, to "horizontal direction". Then, the flow returns to step S3-4 shown in FIG. 3.

If a discrimination has been made in step S3-8 that plural projections do not exist, CPU 1 discriminates in step S3-12 whether or not the upper and lower positions of the projection and the upper and lower positions of the image block coincide with one another. If they coincide with one another, the flow proceeds to step S3-15 so that CPU 1 sets the "process status" to the "end of the process". If a discrimination has been made in step S3-12 that the upper and lower positions of the projection and the upper and lower positions of the image block do not coincide with one another, CPU 1 changes the upper and lower position information of the image block to the upper and lower positions of the projection. In step S3-14 CPU 1 sets the "previous projection direction status" to the "horizontal direction", and then the flow returns to step S3-4 shown in FIG. 3.

The routine shown in FIG. 5 will now be described. In step S3-16 CPU 1 acquires the projection in the vertical direction. In step S3-17 CPU 1 discriminates whether or not plural projections exist. If plural projections exist, CPU 1 divides the image block in the vertical direction into the number of the projections. At this time, the position information of each image block is set in such a way that the upper and lower positions of the projection are used as the upper and lower coordinates and that the right and left positions of the image block, which has not been divided, are used as the right and left coordinates. Then, in step S3-19 CPU 1 sets all "process status" of the divided image block to "under processing". In step S3-20 CPU 1 sets all "previous projection direction status" of the image block, which has been divided, to the "vertical direction". Then, the flow returns to step S3-4 shown in FIG. 3.

If a discrimination has been made in step S3-17 that plural projections do not exist, CPU 1 discriminates, in step S3-21, whether or not the right and left positions of the projection and the right and left positions of the image block coincide with one another. If they coincide with one another, the flow proceeds to step S3-15 shown in FIG. 4 so that CPU 1 sets the "process status" to the "completion of the process". If a discrimination has been made in step S3-21 that the right and left positions of the projection and the right and left positions of the image block do not coincide with one another, CPU 1 changes right and left position information items of the image block to the right and left positions of the projection in step S3-22. In step S3-23 CPU 1 set the "previous projection direction status" to the "vertical direction". Then, the flow returns to step S3-4 shown in FIG. 3.

Figure 8A:
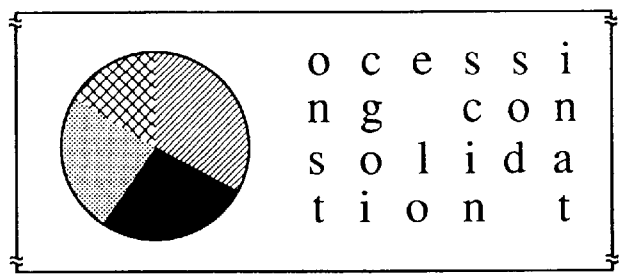
FIGS. 8A–8E are diagrams which illustrate an image block dividing process to be performed by the apparatus of FIG. 1.
Figure 8B:
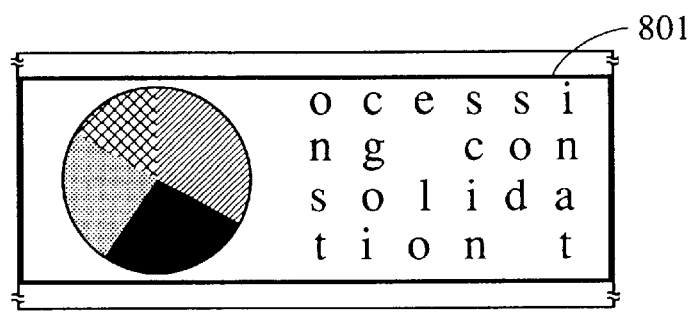
Figure 8C:
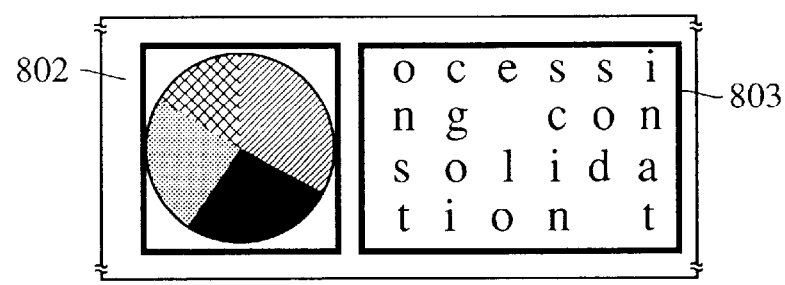
Figure 8D:
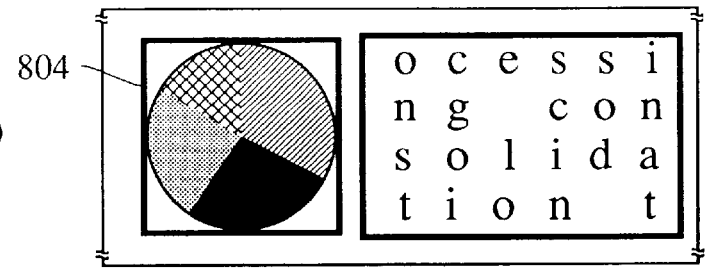

The foregoing process will now be described with reference to FIGS. 8A–8E. FIG. 8A illustrates the display 7 in a state where the process has not yet started, the foregoing state being set as a first image block. First, one projection can be acquired in the horizontal direction so that an image block 801 is obtained as shown in FIG. 8B. Then, a vertical projection of the image block 801 is acquired so that the image block 801 is divided into two image blocks 802 and 803 as shown in FIG. 8C. By acquiring the horizontal projection of the image block 802, an image block 804 can be obtained as shown in FIG. 8D. Since the right and left positions of the vertical projection of the image block 804 coincides with the right and left positions of the projection, the status is set to "completion of the process".

Figure 8E:
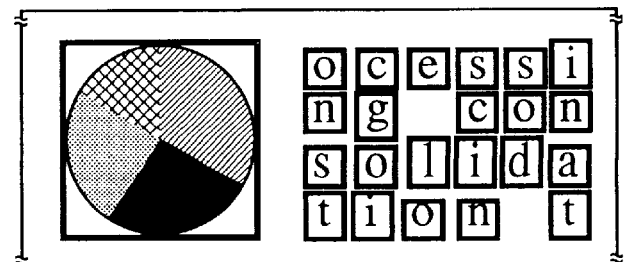

The residual image block 803 is subjected to a similar process to which the image block 802 has been subjected. As a result, a multiplicity of image blocks as shown in FIG. 8E can be obtained.

A process to be executed in step S2-5 shown in FIG. 2, that is, an example of a process for selecting an appointed image block will now be described with reference to a flow chart shown in FIG. 6. The axis of coordinates are arranged in such a way that the left upper position is set to the origin, the x-coordinate is set toward the right and y-coordinate is set toward the bottom. First, the left upper coordinates of a rectangular region appointed in step S6-1 are set to (X1, Y1) and the right lower coordinates of the same are set to (X2, Y2).

Then, the image blocks are obtained in step S6-2, and are arranged in the order of processing, and the leading image block is set to an image block of interest in step S6-3. Then, the following process is performed starting from the foregoing image block. In step S6-4 a determination is made as to whether or not an image block of interest to be processed exists. If it does not exist, this process is ended. If it exists, the flow proceeds to step S6-5.

In step S6-5 the left upper coordinates of the image block of interest are set to (x1, y1) and the right lower coordinates of the same are set to (x2, y2). If the left upper point (x1, y1) of the image block of interest is, in next step S6-6, present at a right lower position with respect to the left upper point (X1, Y1) of the appointed rectangular region or if the right lower point (x2, y2) of the image block of interest is, in step S6-7, present at a left upper point with respect to the right lower point (X2, Y2), the image block of interest is set to the appointed image block in step S6-8. Then, the order of the image block of interest is advanced by one in step S6-9, and the flow returns to step S6-4. As a result of the foregoing process, an appointed image block can be selected from a plurality of image blocks.

If the left upper point (x1, y1) of the image block of interest is not, in step S6-6, present at a right lower position with respect to the left upper point (X1, Y1) of the appointed rectangular region or if the right lower point (x2, y2) of the image block of interest is not, in step S6-7, present at a left upper point with respect to the right lower point (X2, Y2), step S6-8 is not executed, and the flow proceeds to step S6-9.

As described above, according to this embodiment, the image block in the form of a circumscribed rectangle can be obtained by cutting and therefore only required image blocks can easily be selected.

Although this embodiment has a structure in which the appointed image block can be set only in a case where the overall portion of the image block is set to the appointed area, another structure may be employed in which an appointed image block can be set if a portion of the image block is set to the appointed area.

Second Embodiment

A second embodiment of the present invention will now be described with reference to FIGS. 9, 10A and 10B. Although the foregoing image block dividing method according to the first embodiment is able to process, with a simple procedure and a light load required, an image, such as a document image having image blocks arranged vertically or horizontally, it sometimes encounters an impossibility of sufficiently finely dividing image blocks that are arranged in a complicated manner. This embodiment is arranged to be capable of finely dividing image blocks even if they are arranged in a complicated manner.

Figure 9:
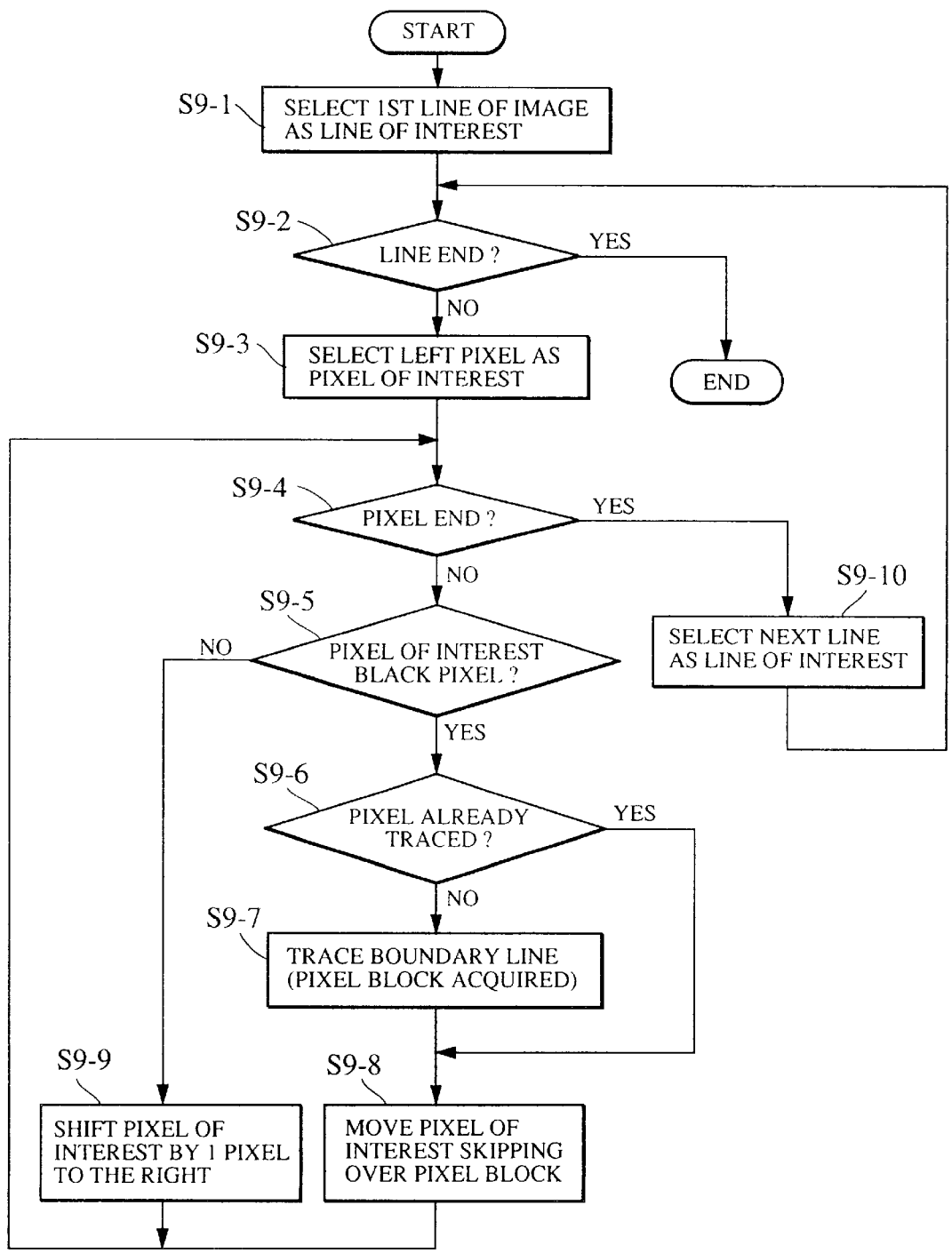
FIG. 9 is a flow chart which illustrates a procedure of controlling an image block dividing process to be performed by an image processing apparatus according to a second embodiment of the present invention.
Figure 10A:
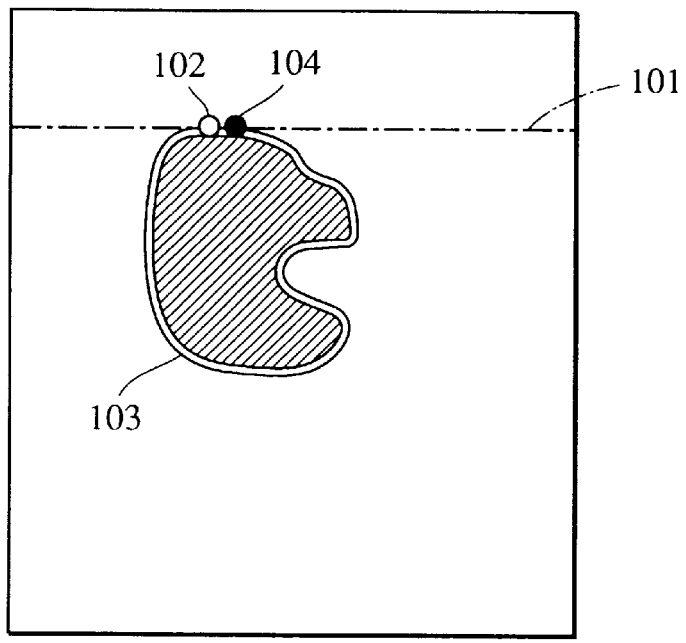
FIGS. 10A and 10B are diagrams which illustrate an image block dividing process to be performed by the apparatus of FIG. 1.

FIG. 9 is a flow chart which illustrates a procedure of performing control of a process of dividing an image block in an image processing apparatus according to this embodiment. FIGS. 10A and 10B illustrate states of a display which are performed in the image block dividing process.

In step S9-1 shown in FIG. 9, in order to start processing at the first line of an image, the first line is selected as a line of interest. In step S9-2, whether or not the line has been completed is discriminated. If it has been completed, this process is ended, and if it has not been completed the flow proceeds to step S9-3. In step S9-3, a left pixel to the line of interest to be processed is set as a pixel of interest, and observation is made from the left portion to the right portion. In step S9-4, whether or not the pixel is finished (whether or not the pixel of interest exists) is discriminated. If the pixel is finished, the next line is set to a line of interest in step S9-10, and then the flow returns to step S9-2 in which the next line is processed. If the pixel is not finished, the flow proceeds to step S9-5.

In step S9-5, whether or not the pixel of interest is a black pixel is discriminated. If the pixel of interest is not a black pixel but the same is a white pixel, the pixel of interest is shifted to the right by one pixel in step S9-9. Then, the flow returns to step S9-4. If the pixel is a black pixel, a discrimination is, in step S9-6, made whether or not the boundary line of the pixel has been traced. If the pixel is not the traced pixel, the boundary is, in step S9-7, traced so that an image block is obtained. In step S9-8, the image block is skipped over so that the pixel of interest is shifted, and the flow returns to step S9-4.

If a discrimination has been made in step S9-6 that the pixel is the traced pixel, step S9-7 is not executed, and the flow proceeds to step S9-8.

The foregoing process will now be described with reference to FIGS. 10A and 10B. Referring to FIG. 10A, reference numeral 101 represents a present line of interest, and illustrates a state where a black pixel 102 has been found. Since the black pixel 102 is in a state where its boundary has not been traced, a boundary line 103 is obtained. When the boundary line 103 has been returned to the original black pixel 102, tracing is dismissed and it is set to an image block. In order to return to a process for searching a black pixel, the pixel of interest is shifted to the right. In this state, attention is paid to a fact that the point is not a point on the obtained boundary line 103 at the time of determining a next pixel 104.

Figure 10B:
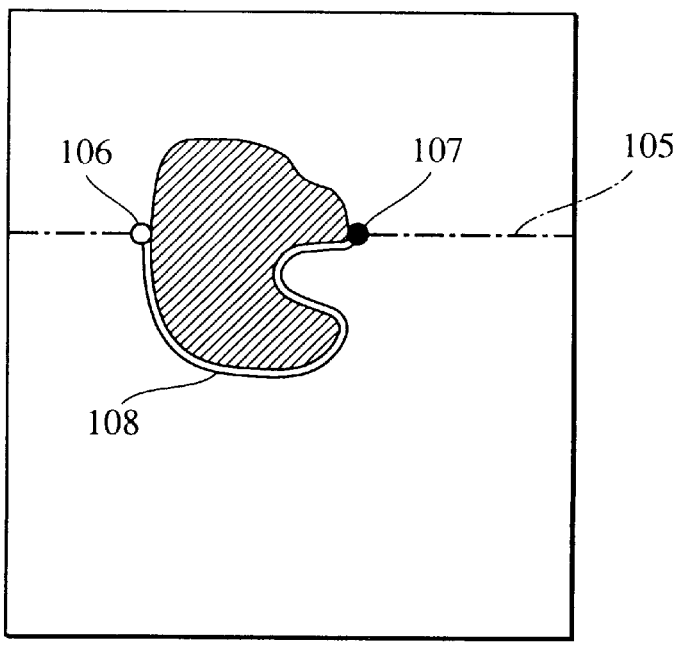

An assumption is made that the line of interest 101 has been processed and setting to the line of interest is shifted to a line 105 of interest shown in FIG. 10B. Referring to FIG. 10B, the found point of a black pixel 106 is a point on a boundary line 108, and therefore the image block is skipped over to continue the process at a next pixel 107. Thus, an image block on the image can be obtained.

As described above, according to this embodiment, if a supplied image cannot be divided by using a projection, image blocks can be obtained in units of boundary lines.

Although the black pixel is, in this embodiment, searched from the upper line to the lower line and from the left portion toward the right portion, the searching method is not limited to this. A pre-treatment, such as an image thinning process, may be performed before the black pixel is searched.

Third Embodiment

Figure 11:
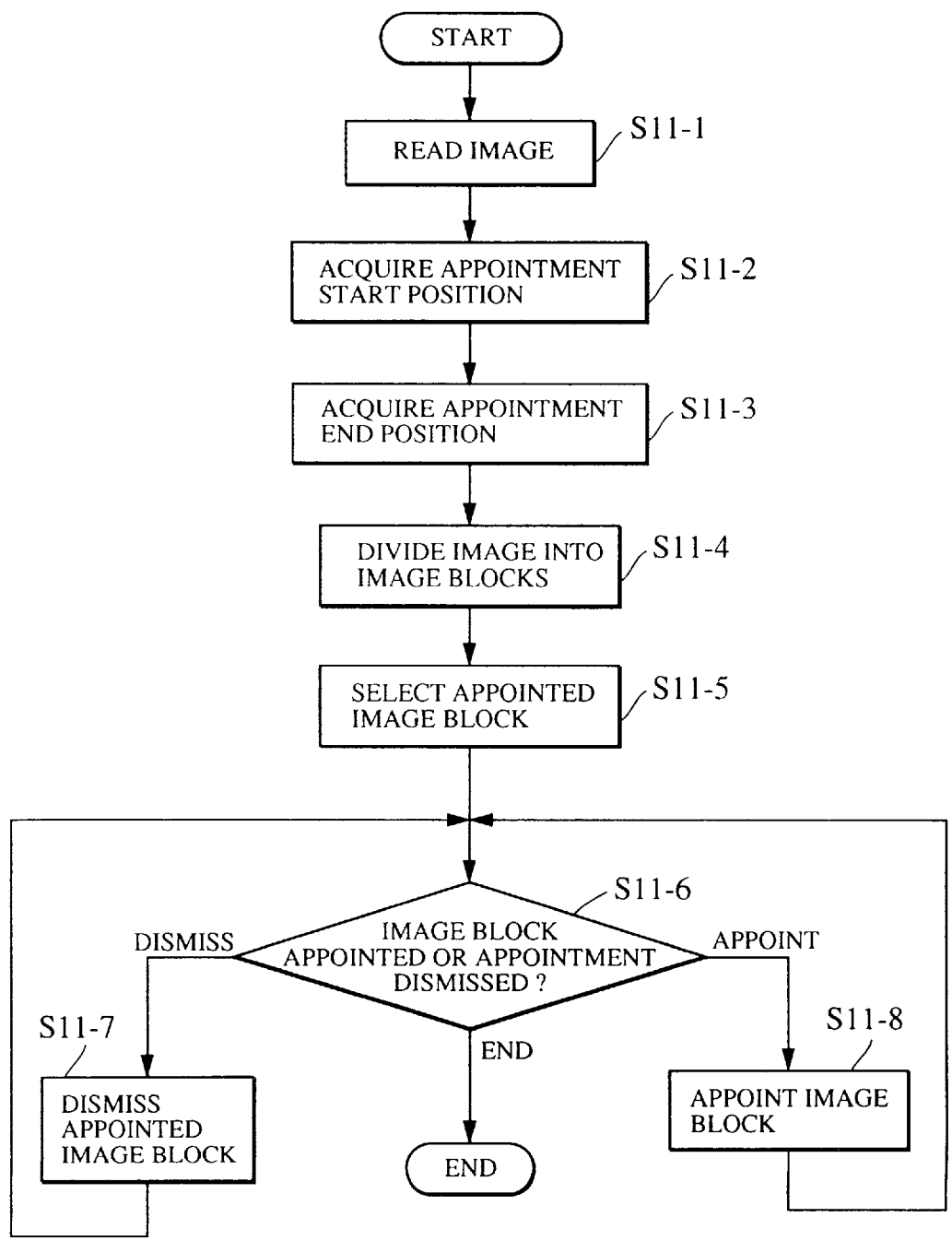
FIG. 11 is a flow chart which illustrates a procedure of controlling an area appointing process to be performed by an image processing apparatus according to a third embodiment of the present invention.
Figure 12:
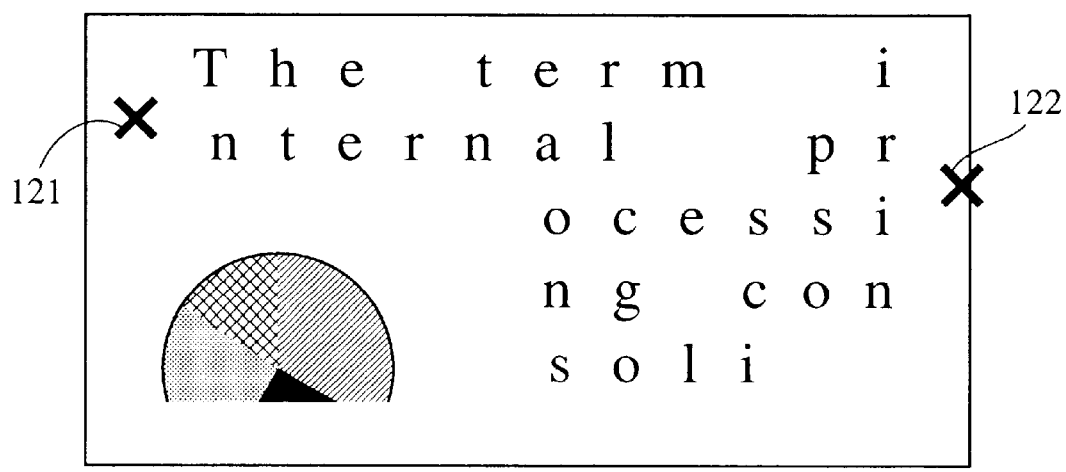
FIG. 12 is a diagram which illustrates a state of a display of the apparatus of FIG. 1 on which an area appointment start position and an area appointment end position are displayed.

A third embodiment of the present invention will now be described with reference to FIGS. 11 and 12. Since the structure of an image processing apparatus according to this embodiment is the same as that of the first embodiment shown in FIG. 1, the description will be made with reference to FIG. 1. FIG. 11 is a flow chart which illustrates a procedure of controlling a process to be performed by the image processing apparatus according to this embodiment. FIG. 12 illustrates a state of the display which is performing the process.

In step S11-1 shown in FIG. 11, image information is read by the image scanner 9 or images previously stored in the external storage unit 8 are read. A state of the display 7 at this time is similar to that realized in the first embodiment shown in FIG. 7. In step S11-2, a point on the image, at which the depression button 3a of the pointing device 3 is depressed, is set to the start point of the area appointment. CPU 1 acquires the coordinates of the start point, and at step S11-3, a point on the image, at which the depression button 3a of the pointing device 3 is again depressed, is set to the final point of the area appointment. CPU 1 then acquires the coordinates of the start point. FIG. 12 is a diagram which illustrates the state of the display 7 on which an appointment start position 121 and an appointment completion position 122 are displayed.

In step S11-4, an image block is taken from an image included in a rectangular appointed area, the diagonal positions of which are set to the appointment start position and the appointment completion position. The taken image block is, as an appointed image block, selected in step S11-5. Then, the image block is appointed, dismissed or completed in step S11-6.

When the image block is dismissed, the pointing device 3 is brought to the image block already appointed in step S11-7 and then the depression button 3a of the pointing device 3 is depressed so that the appointment is dismissed. After the appointment has been dismissed, the flow returns to step S11-6. When an image block is appointed, the pointing device 3 is brought to a position adjacent to the image block dismissed from the appointment in step S11-8 and the depression button 3a of the pointing device 3 is depressed to again appoint the image block. When the image block has been appointed, the process is ended.

As described above, according to the present invention, the process for dividing the image into image blocks is performed in a portion of the image in place of the overall portion of the image. Therefore, the time taken to complete the process can be shortened. Since appointment and dismissal for each image block can be enabled, appointment can be finely performed.

Fourth Embodiment

A fourth embodiment of the present invention will now be described with reference to FIGS. 13 to 18. In a case where an area in a character image of a supplied document is appointed with the area appointment of an image to be performed in accordance with the flow chart according to the first embodiment shown in FIG. 2, there sometimes arises a desire of appointing an area of a sentence from a first character of the appointment to the final character of the appointment in place of the appointment of a rectangular area performed in the first embodiment. This embodiment is arranged to appoint an area as a sentence from a first character of the appointment to the final character of the appointment.

Figure 13:
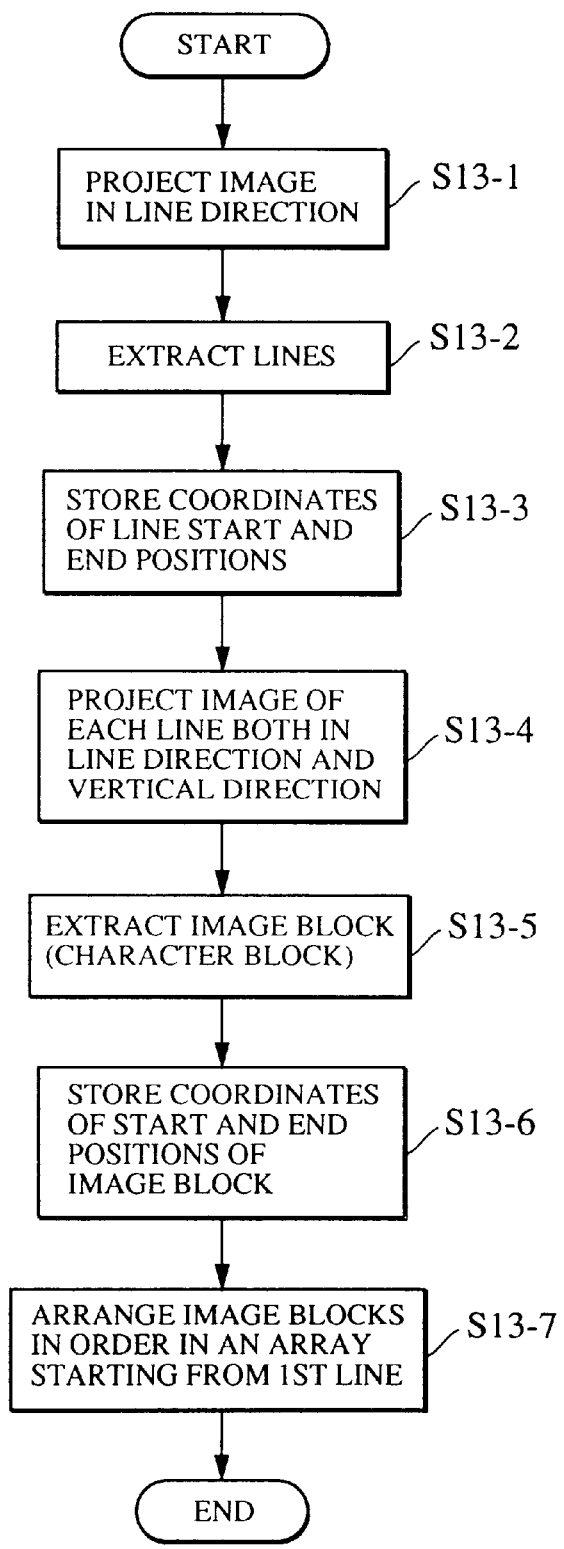
FIG. 13 is a flow chart which illustrates a procedure of controlling an image block dividing process to be performed by an image processing apparatus according to a fourth embodiment of the present invention.
Figure 16:
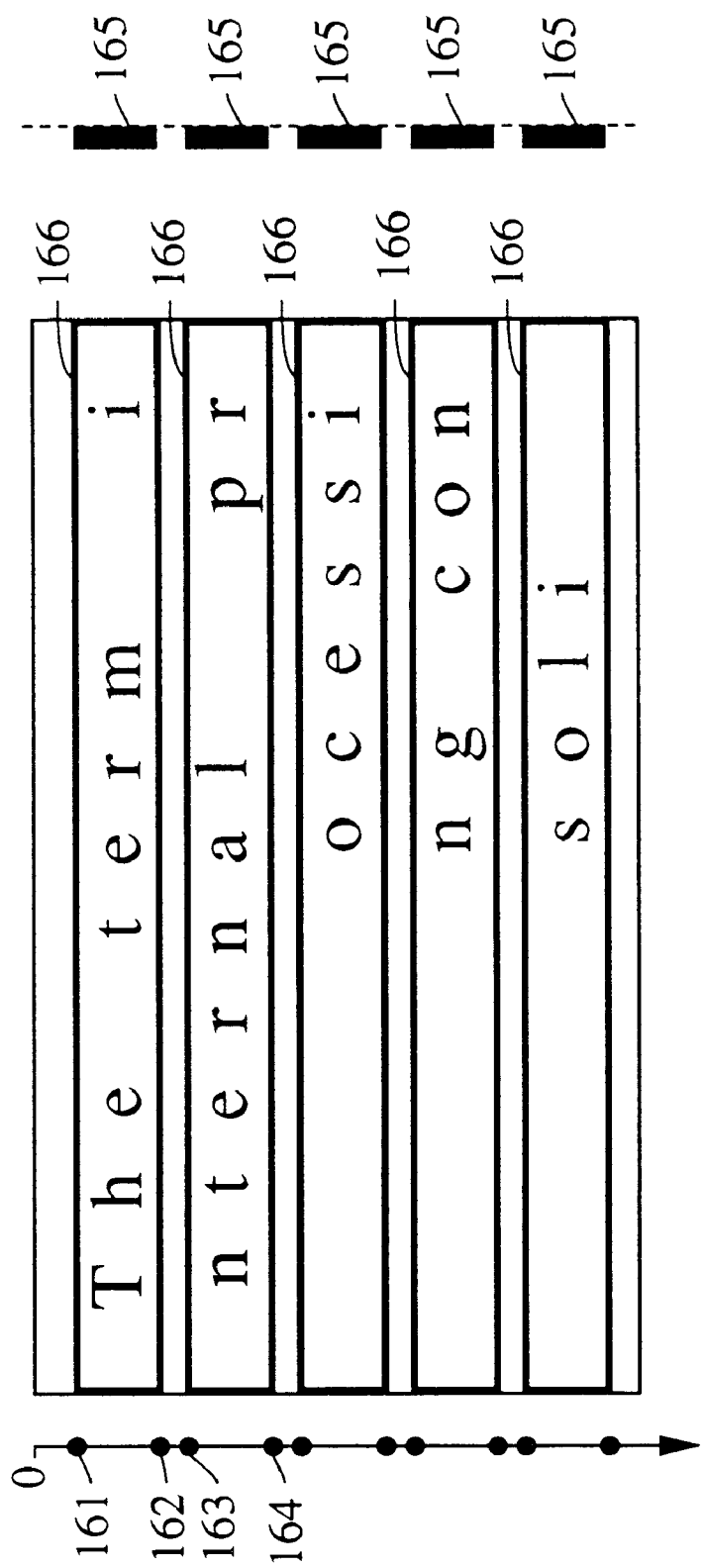
FIG. 16 is a diagram which illustrates an image block dividing process and an image block appointing process to be performed by the apparatus of FIG. 1.
Figure 17:
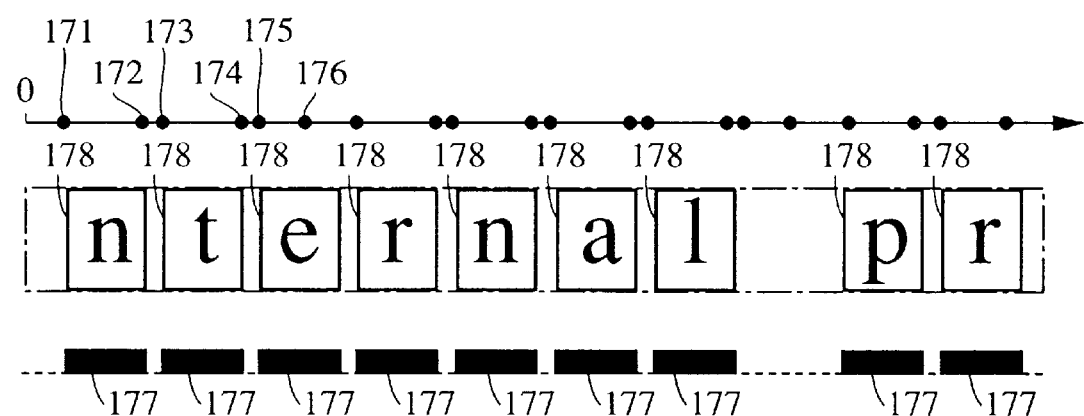
FIG. 17 is a diagram which illustrates an image block dividing process and an image block appointing process to be performed by the apparatus of FIG. 1.
Figure 18:
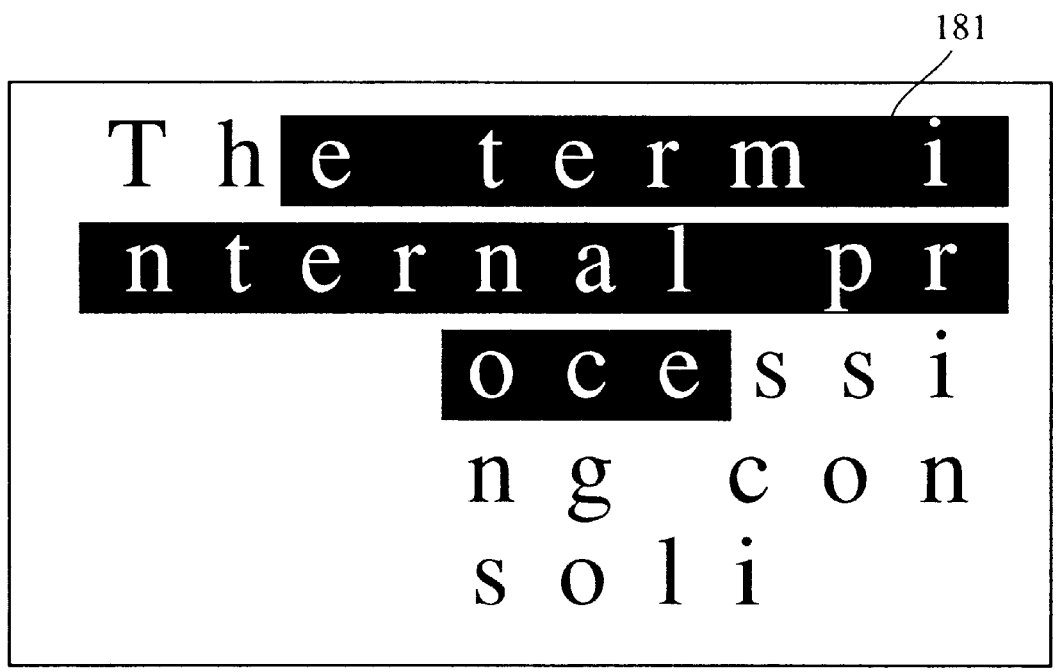
FIG. 18 is a diagram which illustrates an image block dividing process and an image block appointing process to be performed by the apparatus of FIG. 1.

FIG. 13 is a flow chart which illustrates the procedure of controlling a process of dividing an image block to be performed by an image processing apparatus according to this embodiment. FIGS. 16 to 18 are explanatory views which illustrate the image block dividing process and the process of an image block to be performed by the apparatus according to this embodiment. Also in this embodiment, an assumption is made that the document direction of the document image has been detected prior to performing the process according to this embodiment.

In step S13-1 shown in FIG. 13, a projection is acquired in the direction of lines of the document. In a case of a horizontal document, a projection 165 shown in FIG. 16 is obtained. Then, in step S13-2, lines are extracted so that a linear rectangle 166 is obtained. In step S13-3, the obtained start and end coordinates of the line are stored. Referring to FIG. 16, reference numeral 161 represents line start coordinates of a first line, 162 represents line end coordinates of the first line, 163 represents line start coordinates of a second line, and 164 represents line end coordinates of the second line.

In step S13-4, a projection for each line is acquired in a direction (a vertical direction) perpendicular to the direction of the line so that a projection 177 shown in FIG. 17 is obtained. In step S13-5, an image block (a character block) 178 shown in FIG. 17 is obtained. In step S13-6, the start coordinates and end coordinates of the image block are stored. Referring to FIG. 17, reference numeral 171 represents an image block start coordinates of a first character of a line, 172 represents image block end coordinate of the first character of the line, 173 represents image block start coordinates of a second character of the line, and 174 represents image block end coordinates of the second character of the line. The thus-obtained image blocks are arranged in an array starting from the first line in step S13-7, and the process is ended.

When an appointed image block is selected, there arises a necessity of selecting the appointment area start image block and the appointment area end image block.

Figure 14:
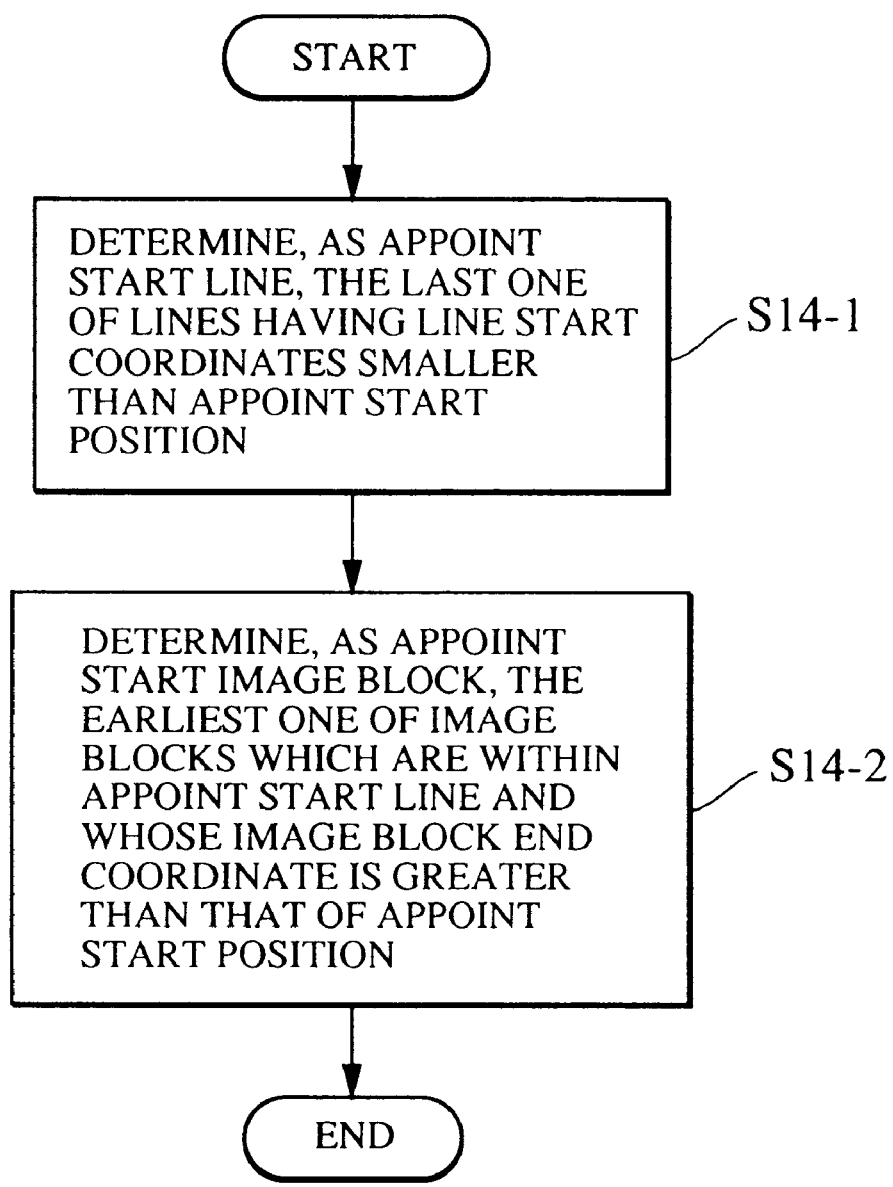
FIG. 14 is a flow chart which illustrates a procedure of controlling a process for searching an appointed area start image block to be performed by the apparatus of FIG. 1.

FIG. 14 is a flow chart which illustrates the procedure of controlling a process for searching an appointment area start image block. In step S14-1 shown in FIG. 14, a last line of lines of a type having line start coordinates which are smaller than the appointment start position is determined as the appointment start line. In step S14-2, the earliest one of the image blocks which are within an appoint start line and whose image block end coordinate is greater than that of appoint start position is determined as the appointment area start image block. Then, this process is completed.

Figure 15:
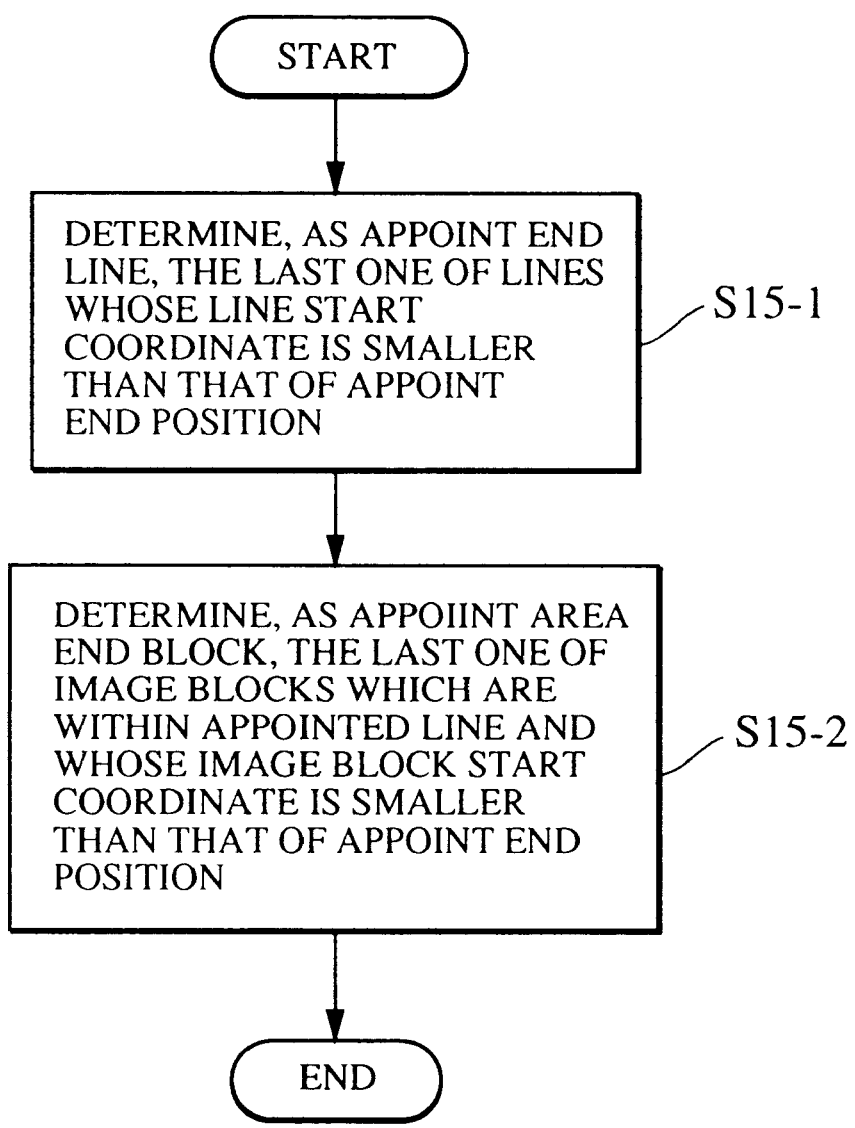
FIG. 15 is a flow chart which illustrates a procedure of controlling a process for searching an appointed area end image block to be performed by the apparatus of FIG. 1.

FIG. 15 is a flow chart which illustrates the procedure of controlling a process for searching the appointment area completion image block. In step S15-1 shown in FIG. 15, a last line of lines having a line start coordinate smaller than the appointment end position is determined to be the appointment end line. In step S15-2, a last image block of those of the appointment end line and whose image block start coordinate is smaller than the appointment end position is determined to be the appointment area end image block. Then, this process is completed.

If the appointment area start image block and the appointment area end image block are obtained, they are searched from the image block array obtained in step S13-7 shown in FIG. 13 so that all image blocks present between the appointment area start image block and the appointment area end image block are determined to be appointed image blocks.

The display of the appointed image blocks may be performed variously, for example, the inverse display of the image blocks employed in the foregoing embodiments and display for changing the color. A display shown in FIG. 18 may be employed in which the overall body of a rectangular form 181 between the appointment area start image block and the appointment area end image block is inversely displayed.

As described above, according to this embodiment, a portion of a document image can be appointed without collapse of the sentences.

The rule for selecting the image blocks is not limited to the method according to this embodiment.

Fifth Embodiment

A fifth embodiment of the present invention will now be described with reference to FIGS. 19 and 20. When an image of a table is supplied and a cell of the table is appointed by the image area appointment method arranged as shown in the flow chart shown in FIG. 2 according to the first embodiment, there sometimes arises a case where one cell is intended to be formed in one image block. This embodiment is arranged to process the one cell into one image block.

Figure 19:
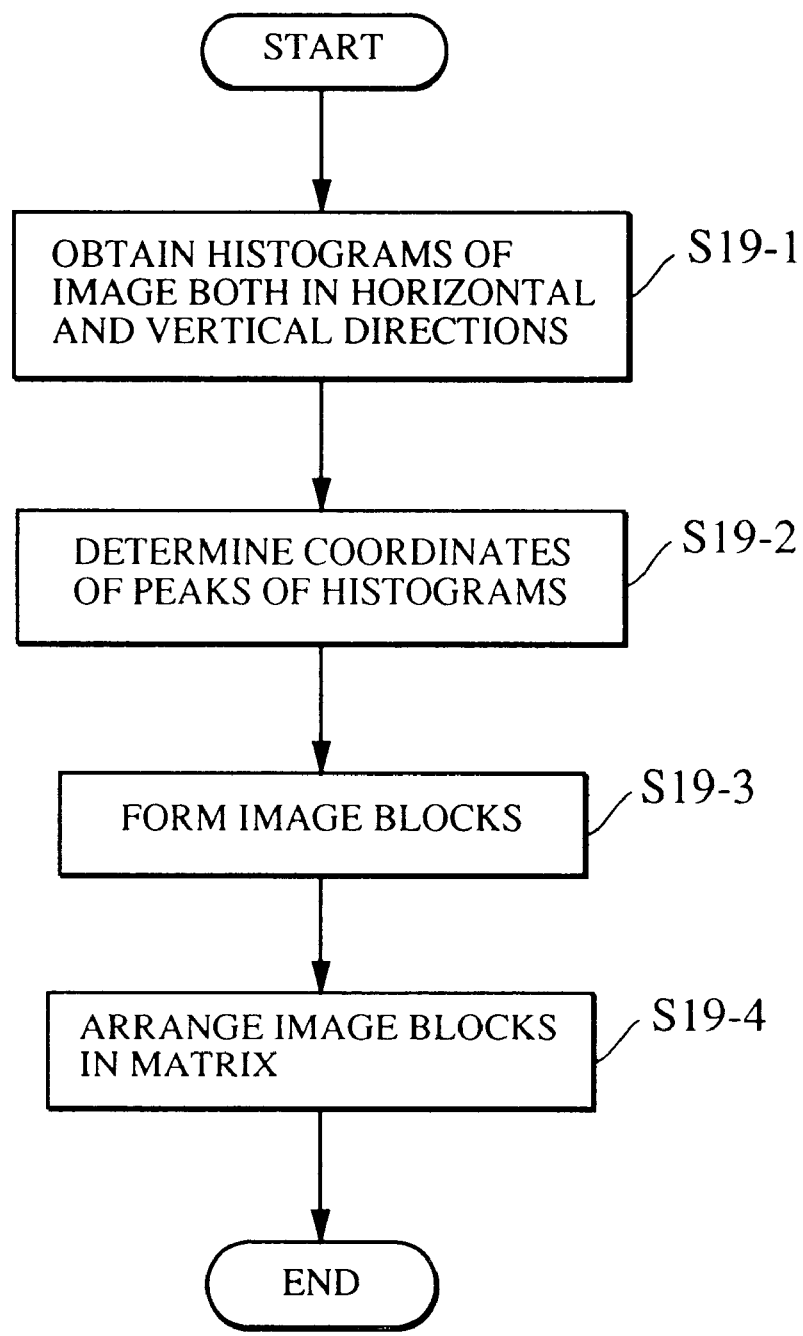
FIG. 19 is a flow chart which illustrates a procedure of controlling an image block dividing process to be performed by an image processing apparatus according to a fifth embodiment of the present invention.
Figure 20:
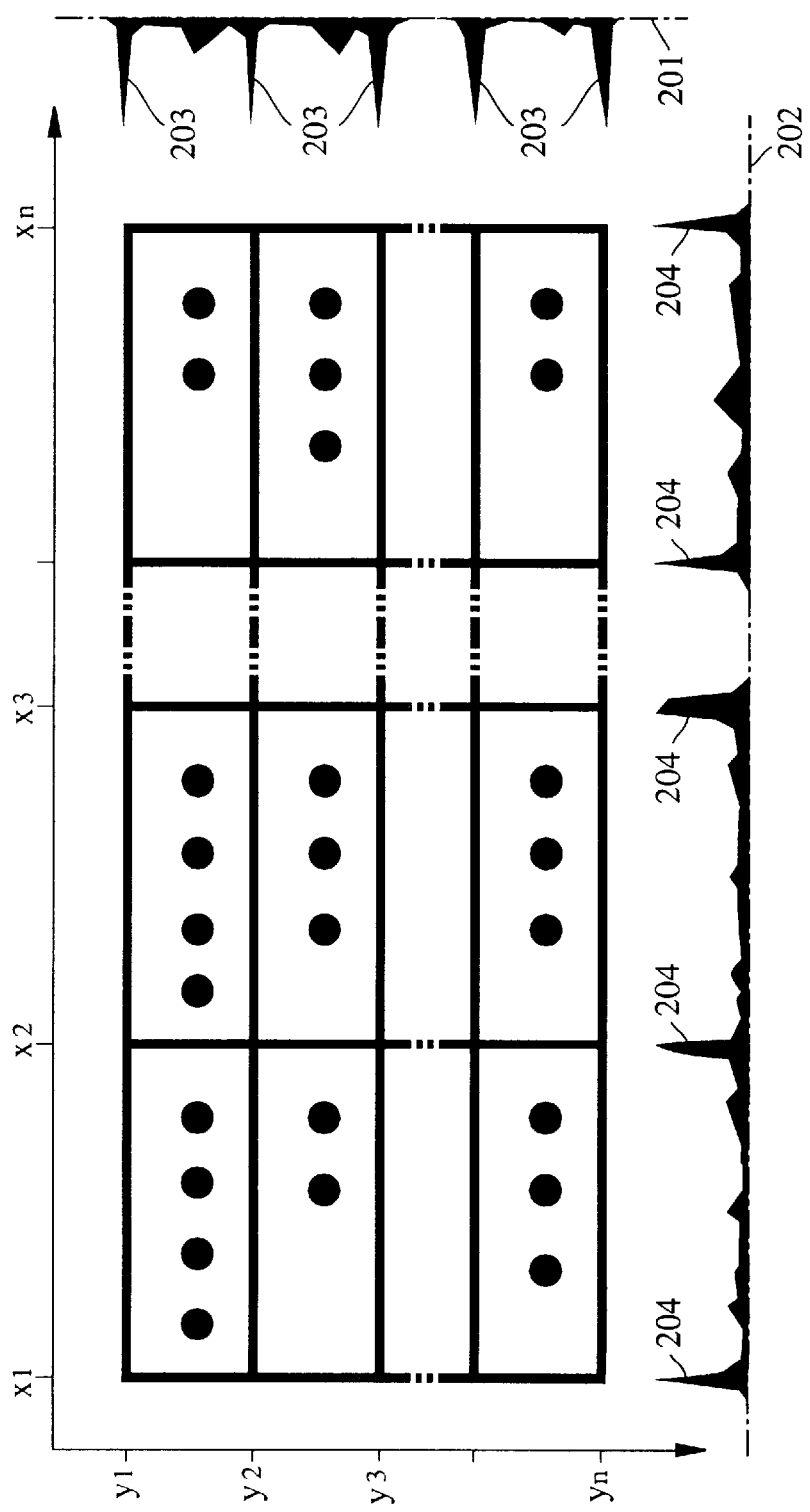
FIG. 20 is a diagram which illustrates an image block dividing process to be performed by the apparatus of FIG. 1.
Figure 21:
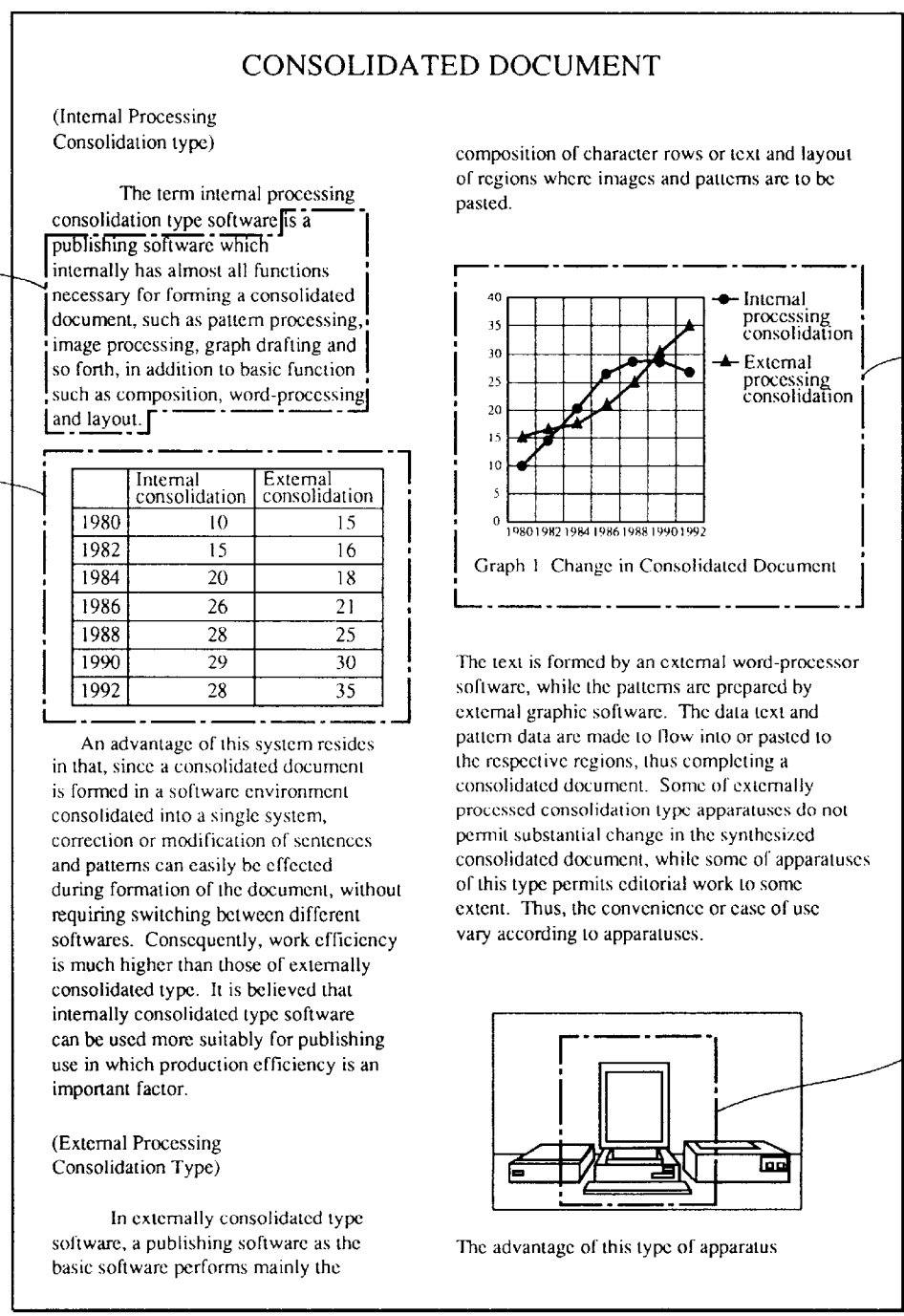
FIG. 21 is a diagram which illustrates an image of a usual original document as displayed on the display device shown in FIG. 1.

FIG. 19 is a flow chart which illustrates the procedure of a process to be performed by the image processing apparatus according to this embodiment. In step S19-1 shown in FIG. 19, histograms of an image are acquired in the horizontal and vertical directions. Referring to FIG. 20, reference numeral 201 represents the histogram in the horizontal direction, and 202 represents the histogram in the vertical direction. Since many black pixels exist in the portions of the table in which ruled lines are present, the peak of the histogram can be considered as the positions of the ruled lines. Therefore, in step S19-2, coordinates of the peaks of the histograms are obtained. Referring to FIG. 20, reference numeral 203 represents the coordinate (the point) of the peak of the histogram in the horizontal direction, and 204 represents the coordinate (the point) of the peak of the histogram in the vertical direction. If the thus-obtained points are set to $(Y1, Y2, \ldots, Yn)$, $(X1, X2, \ldots, Xn)$, a rectangular image block having two points $(Xp, Yq)$ $(Xp+1, Yq+1)$ (where $1 \leq p \leq m-1$, $1 \leq q \leq n-1$) as the diagonals is made in step S19-3. In step S19-4, image blocks having two points $(Xt, Yu)$ $(Xt+1, Yu+1)$, which are set to diagonals in matrix $(t, u)$ are arranged as shown in FIG. 20.

As described above, according to this embodiment, a table image can be appointed in a cell unit. Since the image blocks are disposed in a matrix, only a specific line or array can be appointed.

It is preferable that the method of selecting the appointed image block in this embodiment be an appointment image block method if an image block, that is, a portion of the cell of a table overlaps the rectangular appointed area described in the first embodiment.

Sixth Embodiment

The image read in step S2-1 according to the first embodiment shown in FIG. 2 has an arrangement in which a table, a graph and a photograph and the like are disposed in a variety of layouts. Therefore, a means for dividing the input image into regions is provided, an operation of appointing an area with respect to each region is performed, a discrimination is made whether or not the appointment area start position and the end position of the appointment area exist in the same region, the area appointment is performed similarly to the foregoing embodiments if the two positions exist in the same region. The structure is arranged in such a manner that one of a plurality of the area appointing methods according to the foregoing embodiments and the conventional examples can be selected by switching and the area appointing method is switched in each region.

According to this embodiment, for example, an area of a multistage document image can be appointed without collapse of sentences if the area is divided for each stage. Further, undesirable appointment of a character image existing in another stage can be prevented. In a case where characters and photographs are disposed in one image, the arrangement enabling the area appointment method to be changed over permits use of the method according to the fourth embodiment when an area of a character image region is appointed and permits use of the conventional method when an area of a photograph region is appointed.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. An image processing method comprising:
   an image block dividing step of dividing a plurality of character image blocks from a read image, the character image blocks constituting a document of a plurality of lines;
   a storing step of storing a plurality of coordinate data of a character image block for specifying a position of each divided character image block in the read image, in an order of a document reading direction;
   an appointing step of appointing two arbitrary coordinates in different lines on a read image displayed on a display;
   a start and end character image blocks deciding step of deciding a start character image block and an end character image block by comparing the appointed two arbitrary coordinates with the plurality of coordinate data of character image blocks stored in said storing step;

a character image blocks selecting step of selecting character image blocks disposed between the start and end character image blocks from the plurality of character image blocks constituting the document of the plurality of lines, based on the order of a document reading direction; and an outputting step of outputting a part of the image comprising said plurality of selected character image blocks.

2. An image processing method according to claim 1, wherein said appointing step has a plurality of appointing processes, further including a switching process step for switching process step of switching said appointing processes used in said appointing step.

3. An image processing method according to claim 1, wherein when the divided character image blocks are in an image block array, the start character image block is selected from the image block array in accordance with one of the appointed two arbitrary coordinates, and the end character image block is selected from the image block array in accordance with the other of the appointed two arbitrary coordinates, and the character image blocks disposed between the start and end character image blocks are selected based on the order of a document reading direction in the image block array, in the character image blocks selecting step.

4. An image processing method according to claim 1, wherein when the divided character image blocks are in an image block matrix, the start character image block is selected from the image block matrix in accordance with one of the appointed two arbitrary coordinates, and the character image blocks are selected based on the order of a document reading direction in the image block matrix, in the character image blocks selecting step.

5. An image processing method according to claim 1, further including a character image blocks display process step of displaying the divided character image blocks.

6. An image processing method according to claim 1, further including an appointed coordinates display process step of displaying the appointed two arbitrary coordinates.

7. An image processing method according to claim 1, further including a selected character image blocks display process step of displaying the selected character image blocks in a manner different from the other character image blocks.

8. An image processing method according to claim 1, further including a selection dismissing process step of dismissing the selected character image block.

9. An image processing method according to claim 1, further including a character image block adding process step of adding, as the selected character image block, a character image block which has not been selected.

10. An image processing method according to claim 1, further including a discrimination process step of discriminating whether or not the start and end character image blocks exist in the same region on a divided image, wherein the character image blocks, selected in the character image blocks selecting step, are selected in the character image blocks in the same region.

11. An image processing method according to claim 1, wherein the read image is an image received by using an image scanner.

12. An image processing apparatus according to claim 11, wherein when the divided character image blocks are in an image block array, the start character image block is selected from the image block array in accordance with one of the appointed two arbitrary coordinates, and the end character image block is selected from the image block array in accordance with the other of the appointed two arbitrary coordinates, and the character image blocks disposed between the start and end character image blocks are selected based on the order of a document reading direction in the image block array, by the character image blocks selecting means.

13. An image processing apparatus according to claim 11, wherein when the divided character image blocks are in an image block matrix, the start character image block is selected from the image block matrix in accordance with one of the appointed two arbitrary coordinates, and the character image blocks are selected based on the order of a document reading direction in the image block matrix, by the character image blocks selecting means.

14. An image precessing apparatus according to claim 11, further including a character image blocks display process means for displaying the divided character image blocks.

15. An image processing apparatus according to claim 11, further including an appointed coordinates display process means for displaying the appointed two arbitrary coordinates.

16. An image processing apparatus according to claim 11, further including a selected character image blocks display process means for displaying the selected character image blocks in a manner different from the other character image blocks.

17. An image processing apparatus according to claim 11, further including a selection and dismissing process means for dismissing the selected character image block.

18. An image processing apparatus according to claim 11 further including a character image block adding process means for adding, as the selected character image block, a character image block which has not been selected.

19. An image processing apparatus according to claim 11, further including a discrimination process means for discriminating whether or not the start and end character image blocks exist in the same region on a divided image, wherein the character image blocks, selected by the character image blocks selecting means, are selected in the character image blocks in the same region.

20. An image processing method according to claim 1, wherein said appointing step is performed on said read image displayed on a CRT.

21. An image processing method according to claim 1, wherein said appointing step is performed on the read image displayed on a liquid crystal display.

22. An image processing method according to claim 1, wherein said appointing step is performed by receiving a coordinate data appointed by a pointing device.

23. An image processing apparatus comprising:

image block dividing means for dividing a plurality of character image blocks from a read image, the character image blocks constituting a document of a plurality of lines;

a storing means for storing a plurality of coordinate data of a character image block for specifying a position of each divided character image block in the read image, in an order of a document reading direction;

an appointing means for appointing two arbitrary coordinates in different lines on a read image displayed on a display;

a start and end character image blocks deciding means for deciding a start character image block and an end character image block by comparing the appointed two arbitrary coordinates with the plurality of coordinate data of character image blocks stored in said storing means;

a character image blocks selecting means for selecting character image blocks disposed between the start and end character image blocks from the plurality of character image blocks constituting the document of the plurality of lines, based on the order of the document reading direction; and an outputting means for outputting a part of the image comprising said plurality of selected character image blocks.

24. An image processing apparatus according to claim 18, having a plurality of image area appointing means, including:

switch means for switching said plurality of image area appointing means.

25. An image processing apparatus according to claim 23, wherein the read image is an image received by using an image scanner.

26. An image processing apparatus according to claim 23, wherein the appointing means appoints the start position on the read image displayed on a CRT.

27. An image processing apparatus according to claim 23, wherein said appointing means appoints the start position on the read image displayed on a liquid crystal display.

28. An image processing apparatus according to claim 23, wherein said appointing means appoints by receiving a coordinate data appointed by using a pointing device.

29. A storage medium for storing a computer readable program for controlling image processing, the program comprising the steps of:

an image block dividing step of dividing a plurality of character image block from the read image, the character image blocks constituting a document of a plurality of lines;

a storing step of storing a plurality of coordinate data of a character image block for specifying a position of each divided image block in the read image, in an order of a document reading direction;

an appointing step of appointing two arbitrary coordinates in different lines on a read image displayed on a display;

a start and end character image blocks deciding step of deciding a start character image block and an end character image block by comparing the appointed two arbitrary coordinates with the plurality of coordinate data of character image blocks stored in said storing step;

a character image blocks selecting step of selecting character image blocks disposed between the start and end character image blocks from the plurality of character image blocks constituting the document of the plurality of lines, based on the order of the document reading direction; and an outputting step of outputting a part of the image comprising said plurality of selected character image blocks.

30. A storage medium according to claim 29, wherein said appointing step has a plurality of appointing process, further including a switching process step of switching said appointing processes used in said appointing step.

31. A storage medium according to claim 29, wherein when the divided character image blocks are in an image block array, the start character image block is selected from the image block array in accordance with one of the appointed two arbitrary coordinates, and the end character image block is selected from the image block array in accordance with the other of the appointed two arbitrary coordinates, and the character image blocks disposed between the start and end character image blocks are selected based on the order of a document reading direction in the image block array, in the character image blocks selecting step.

32. A storage medium according to claim 29, wherein when the divided character image blocks are in an image block matrix, the start character image block is selected from the image block matrix in accordance with one of the appointed two arbitrary coordinates, and the character image blocks are selected based on the order of a document reading direction in the image block matrix, in the character image blocks selecting step.

33. A storage medium according to claim 29, further including a character image blocks display process step of displaying the divided character image blocks.

34. A storage medium according to claim 29 further including an appointed coordinates display process step of displaying the appointed arbitrary coordinates.

35. A storage medium according to claim 29, further including a selected character image blocks display process step of displaying the selected character image blocks in a manner different from the other character image blocks.

36. A storage medium according to claim 29, further including a selection dismissing process step of dismissing the selected character image block.

37. A storage medium according to claim 29, further including a character image block adding process step of adding, as the selected character image block, a character image block which has not been selected.

38. A storage medium according to claim 29, further including a discrimination process step of discriminating whether or not the start and end character image blocks exist in the same region on a divided image, wherein the character image blocks, selected in the character image blocks selecting step, are selected in the character image blocks in the same region.

39. A storage medium according to claim 29, wherein the read image is an image received by using an image scanner.

40. A storage medium according to claim 29, wherein said appointing step is performed on said read image displayed on a CRT.

41. A storage medium according to claim 29, wherein said appointing step is performing on the read image displayed on a liquid crystal display.

42. A storage medium according to claim 29, wherein said appointing step is performed by receiving coordinate data appointed by a pointing device.

* * * * *

UNITED STATES PATENT AND TRADEMARK OFFICE
CERTIFICATE OF CORRECTION

PATENT NO. : 6,212,294 B1
DATED : April 3, 2001
INVENTOR(S) : Hiroaki Ikeda

It is certified that error appears in the above-identified patent and that said Letters Patent is hereby corrected as shown below:

<u>Title page,</u>
Item [57], ABSTRACT,
Line 1, "assigns" should read -- assigns a --.

<u>Sheet 1 of 21,</u>
Fig. 1, "DEVICE" (second occurrence) should read -- UNIT --.

Figure 4:
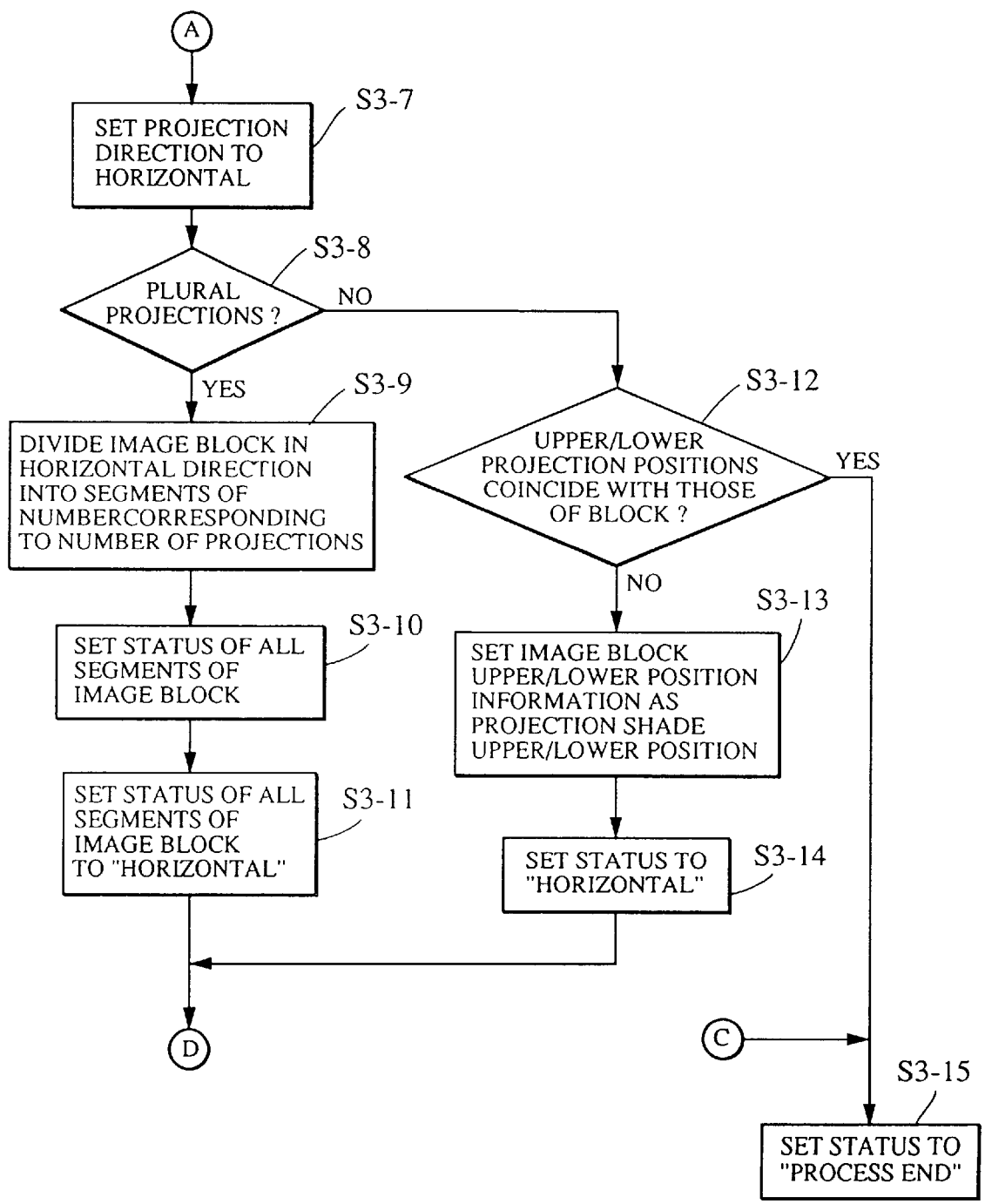
FIG. 4 is a flow chart which illustrates a procedure of controlling an image block dividing process to be performed by the apparatus of FIG. 1.
Figure 5:
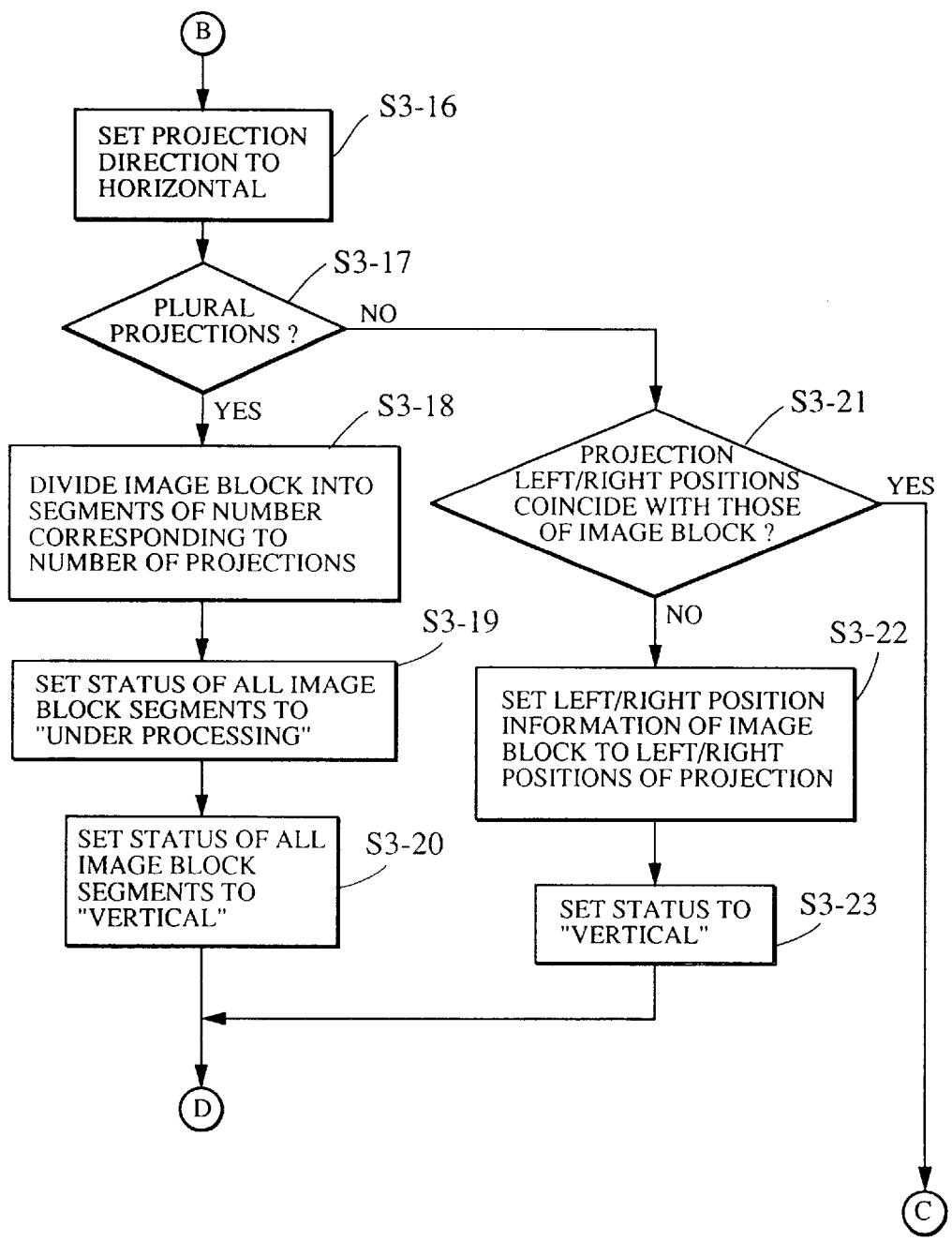
FIG. 5 is a flow chart which illustrates a procedure of controlling an image block dividing process to be performed by the apparatus of FIG. 1.

<u>Sheet 4 of 21,</u>
Fig. 4, "NUMBERCORRESPONDING" should read -- NUMBER CORRESPONDING --.

Figure 6:
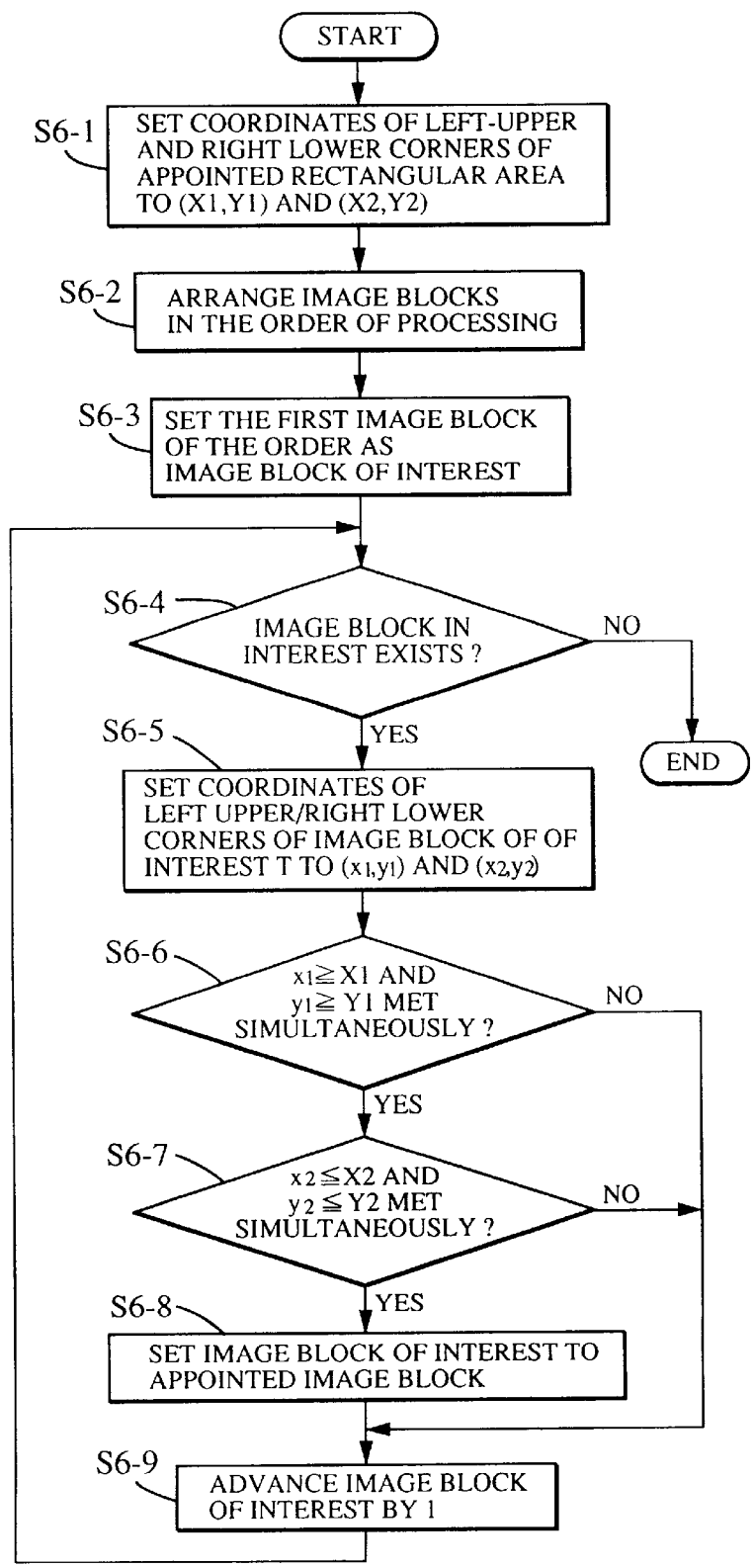
FIG. 6 is a flow chart which illustrates a procedure of controlling an appointed image block selecting process to be performed by the apparatus of FIG. 1.

<u>Sheet 6 of 21,</u>
Fig. 6, "IN" (second occurrence) should read -- OF --; "OF OF" should read -- OF --; and "INTEREST T" should read -- INTEREST --.

<u>Sheet 14 of 21,</u>
Fig. 14, "APPOIINT" should read -- APPOINT --.

<u>Sheet 15 of 21,</u>
Fig. 14, "APPOIINT" should read -- APPOINT --.

<u>Column 2,</u>
Line 6, "circumstance," should read -- circumstances," --.

<u>Column 8,</u>
Line 1, "block" should read -- blocks, --.

<u>Column 9,</u>
Line 36, "coincides" should read -- coincide --; and
Line 47, "and" should read -- and the --.

<u>Column 10,</u>
Line 48, "pixel to" should read -- pixel of --; and
Line 62, "made" should read -- made as to --.

<u>Column 12,</u>
Line 60, "an" should be deleted; and
Line 61, "coordinate" should read -- coordinates --.

UNITED STATES PATENT AND TRADEMARK OFFICE
CERTIFICATE OF CORRECTION

PATENT NO. : 6,212,294 B1
DATED : April 3, 2001
INVENTOR(S) : Hiroaki Ikeda

It is certified that error appears in the above-identified patent and that said Letters Patent is hereby corrected as shown below:

Column 13,
Line 33, "and" should read -- or --; and
Line 62, "peak" should read -- peaks --.

Column 14,
Line 16, "table" should read -- table, --;
Line 25, "made" should read -- made as to --;
Line 27, "the" should read -- and the --; and
Line 35, "multistage" should read -- multi-stage --.

Column 15,
Line 16, "switching process step of" should be deleted.

Column 17,
Line 35, "block" should read -- blocks --.

Column 18,
Line 2, "process," should read -- processes, --;
Line 27, "29" should read -- 29, --; and
Line 54, "performing" should read -- performed --.

Signed and Sealed this

Twenty-sixth Day of February, 2002

JAMES E. ROGAN
Director of the United States Patent and Trademark Office

Attest:

Attesting Officer